(12) United States Patent
Yoshida et al.

(10) Patent No.: US 7,588,610 B2
(45) Date of Patent: Sep. 15, 2009

(54) DUST COLLECTOR AND VACUUM CLEANER HAVING THE SAME

(75) Inventors: Jun Yoshida, Himeji (JP); Kei Takai, Kasai (JP); Kenji Toyooka, Okayama (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 646 days.

(21) Appl. No.: 11/285,109

(22) Filed: Nov. 23, 2005

(65) Prior Publication Data

US 2006/0107628 A1 May 25, 2006

(30) Foreign Application Priority Data

Nov. 25, 2004 (JP) ............................. 2004-341092
Nov. 25, 2004 (JP) ............................. 2004-341093

(51) Int. Cl.
*B01D 46/00* (2006.01)
*A47L 9/16* (2006.01)

(52) U.S. Cl. ............................. 55/309; 55/337; 55/429; 55/472; 55/DIG. 3; 15/347; 15/352; 15/353

(58) Field of Classification Search .................. 55/337, 55/345, 426, 429, 459.1, 472, 482, 525, DIG. 3, 55/309; 15/347, 352, 353
See application file for complete search history.

(56) References Cited

U.S. PATENT DOCUMENTS 4,545,794 A * 10/1985 Himukai ....................... 55/362

| | | | |
|---|---|---|---|
| 6,192,550 B1 | 2/2001 | Hamada et al. | |
| 7,207,083 B2 | 4/2007 | Hayashi et al. | |
| 7,247,181 B2 * | 7/2007 | Hansen et al. | 55/337 |
| 7,419,522 B2 * | 9/2008 | Arnold | 55/345 |
| 2005/0150075 A1 | 7/2005 | Takemoto et al. | |

(Continued)

FOREIGN PATENT DOCUMENTS

JP          60-215341 A          10/1985

(Continued)

OTHER PUBLICATIONS

Notice of Allowance mailed Nov. 27, 2008 in Corresponding Japanese Patent Application No. 2004-341093.

(Continued)

*Primary Examiner*—Duane Smith
*Assistant Examiner*—Minh-Chau T Pham
(74) *Attorney, Agent, or Firm*—Westerman, Hattori, Daniels & Adrian, LLP.

(57) ABSTRACT

A vacuum cleaner of the present invention guides air and dust sucked from an inlet 12 to a dust collection chamber 29 through a guide path 41. A cylindrical passage member 55 is located at a linear section of the guide pipe 41 so that its axial line may come along a direction in which the linear section 52 extends. A plurality of vent holes 47 are formed on the passage member 55 and each of the vent holes 47 is covered with a mesh filter 50. When dust is accumulated in the dust collection chamber 29 to some extent, air flowing into a lead-in pipe 43 flows to the outside (the side of a bypass passage 31) through the vent holes 47 and is guided directly to an outlet by bypassing the dust collection chamber 29.

19 Claims, 17 Drawing Sheets

U.S. PATENT DOCUMENTS

| | | | |
|---|---|---|---|
| 2005/0223519 A1* | 10/2005 | Greene et al. | 15/353 |
| 2005/0241284 A1* | 11/2005 | Yoshida et al. | 55/472 |
| 2007/0186372 A1* | 8/2007 | Rowntree et al. | 15/347 |
| 2007/0186521 A1* | 8/2007 | Yoshida et al. | 55/467 |
| 2008/0256911 A1* | 10/2008 | Oh et al. | 55/346 |

FOREIGN PATENT DOCUMENTS

| | | |
|---|---|---|
| JP | 2000-342492 A | 12/2000 |
| JP | 3460832 | 8/2003 |
| JP | 2004-065699 A | 3/2004 |
| JP | 2004-89263 A | 3/2004 |
| JP | 2004-105364 A | 4/2004 |
| JP | 2004-113361 | 4/2004 |
| JP | 2004-121648 A | 4/2004 |
| JP | 2004-135700 A | 5/2004 |

OTHER PUBLICATIONS

Japanese Office Action dated Sep. 4, 2008 (mailing date), issued in corresponding Japanese Patent Application No. 2004-341093.

Japanese Office Action dated Sep. 4, 2008 (mailing date), issued in corresponding Japanese Patent Application No. 2004-341092.

* cited by examiner

DUST COLLECTOR AND VACUUM CLEANER HAVING THE SAME

BACKGROUND OF THE INVENTION

1. Field of the Invention

The present invention relates to a vacuum cleaner, in particular, a dust collector for capturing dust sucked together with air.

2. Description of Related Art

There is known a vacuum cleaner with a dust collector detachable from a main unit that is capable of taking air and dust sucked from a suction section, thereby capturing the dust sucked together with air into the dust collector and allowing air to pass through the dust collector to discharge from the main unit. The air sucked into the dust collector chamber is guided to a dust collection chamber through a guide pipe and then passes through a filter to be discharged. The dust sucked into the dust collector together with air is captured by the filter while the air passes through the filter and is accumulated in the dust collection chamber. The dust accumulated in the dust collection chamber can be readily removed by detaching the dust collector from the main unit and performing a prescribed operation.

However, in this kind of the vacuum cleaner, when the dust is accumulated in the dust collection chamber to some extent, the flow of air that moves toward the filter through the dust collection chamber is deteriorated, thereby lowering suction force. Then, Patent Publication No. 3460832 discloses a dust collector with a bypass passage for separating part of air sucked into the dust collector and bypassing a dust collection chamber to discharge the air by forming a vent hole in the middle of a guide pipe.

FIGS. 15A and 15B are views showing an example of a guide pipe 141 provided in a conventional dust collector. Specifically, FIG. 15A is a side view of the guide pipe 141 and FIG. 15B is a sectional view of the guide pipe 141.

With reference to FIGS. 15A and 15B, the guide pipe 141 includes an inlet pipe 142 forming an inlet port 112 of the dust collector and a lead-in pipe 143 for leading air and dust flowing from the inlet pipe 142 to a dust collection chamber.

The inlet pipe 142 is provided with a tube 142A shaped in a truncated cone, one and the other sides of which are opened in the axial direction, and a flange 142B projecting from an edge of the tube 142A on its smaller diameter side in the radial direction. One end of a hose, the other end of which is connected to a suction section of a vacuum cleaner, is fitted into the tube 142A of the inlet pipe 142.

The lead-in pipe 143 is shaped in a circular pipe having a bent 146 curved or crooked substantially at right angle along the path and is equipped with a filter section 155 spreading in the shape of a truncated cone at an end coupled to the inlet tube 142. A plurality of vent holes 147 are formed on a circumferential face of the filter section 155 and each of the vent holes 147 is covered with a filter 150. A flange 155A projecting in the radial direction is formed on an edge on a larger diameter side of the filter section 155 (an edge connected to the inlet pipe 142 of the lead-in pipe 143). A circular packing 144 is engaged with the flange 155A and the flange 142B of the inlet pipe 142 abuts on the packing 144, thereby bonding the inlet pipe 142 to the lead-in pipe 143 with a bonded part being sealed.

Most of the air sucked from the inlet pipe 142 is led to the dust collection chamber together with dust through the lead-in pipe 143 and part of the air flows out of the lead-in pipe 143 through the vent holes 147. At this time, dust contained in the air passing through the vent holes 147 is captured by the filter 150. A bypass passage is formed outside of the vent holes 147 and the air flowed out of the vent holes 147 bypasses the dust collection chamber to be discharged. Thus, since the flow of air can be ensured, suction force can be prevented from deterioration.

However, with the conventional configuration described above, an inner diameter of the guide tube is narrowed at the filter section, thereby causing pressure loss in the vicinity of the filter section. Accordingly, there is a possibility that the suction force may be decreased, thereby lowering suction performance.

Furthermore, since the filter section is extended in the shape of a truncated cone, arrangement of the filter section requires relatively large space. Since the space for arranging the dust collector is restricted, when the space for arranging the filter section is made larger, the dust collection chamber needs to be made smaller. In this case, an amount of dust that can be stored in the dust collection chamber becomes smaller. Furthermore, the suction force is lowered when the dust collection chamber is filled with the dust. With the conventional configuration, however, the suction force is decreased in a relatively short period of time, resulting in poor suction performance.

In addition, since the filter is extended in a direction intersecting with a flowing direction of air and dust in the guide tube, dust is easy to adhere to the filter, and in the case where a foreign particle having high gravity (such as a metal piece) flows into the guide pipe, the foreign particle can strike against the filter, thereby damaging the filter. When dust is adhered to the filter, the flow of air to the bypass passage is worsened and the suction force is lowered. Furthermore, when the filter is damaged, a foreign particle can flow into the bypass passage, clogging the passage. Accordingly, in either case, suction performance can be worsened.

SUMMARY OF THE INVENTION

Under such circumstances, a main object of the present invention is to provide a vacuum cleaner capable of maintaining good suction performance for a long time.

Another object of the present invention is to provide a dust collector for a vacuum cleaner with easy maintenance.

In a vacuum cleaner of the present invention, vent holes are formed on an inner wall of a cylindrical guide path for guiding sucked air and dust into a dust collection chamber, and in parallel with the flow of air flowing in the guide path. The vent holes are connected to a bypass passage and air coming into the vent holes bypasses the dust collection chamber and is discharged from an outlet. As the vent holes are opened in parallel with airflow, dust is hard to enter into the vent holes. However, air necessary for ensuring the flow of air flows from the vent holes to the bypass passage depending on pressure in the guide path.

BRIEF DESCRIPTION OF THE DRAWINGS

FIG. 15A is a side view of the guide pipe and FIG. 15B is a sectional view of the guide pipe.

DETAILED DESCRIPTION OF PREFERRED EMBODIMENTS

Figure 1:
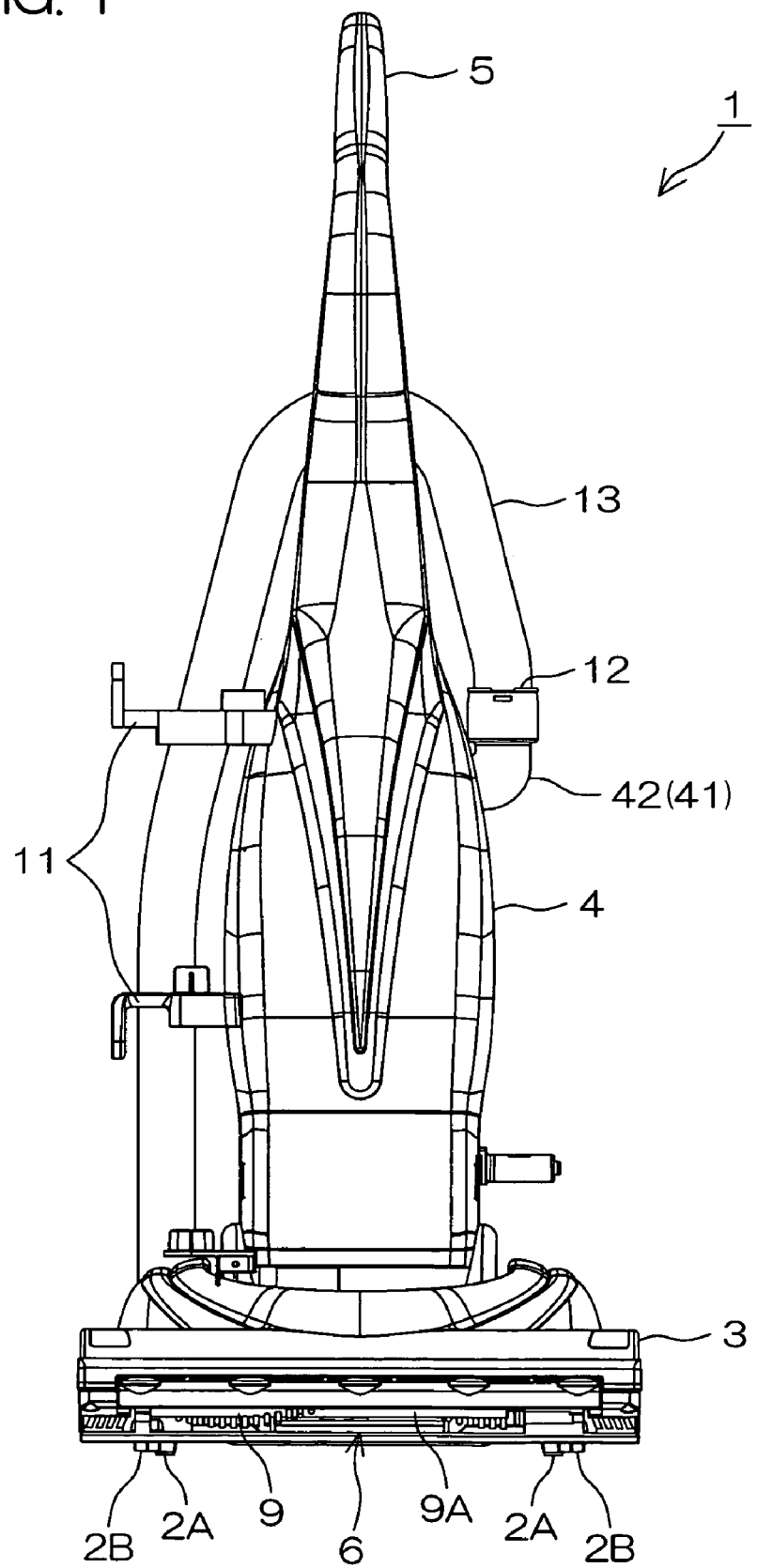
FIG. 1 is a front view of a vacuum cleaner in accordance with a first embodiment of the present invention.
Figure 2:
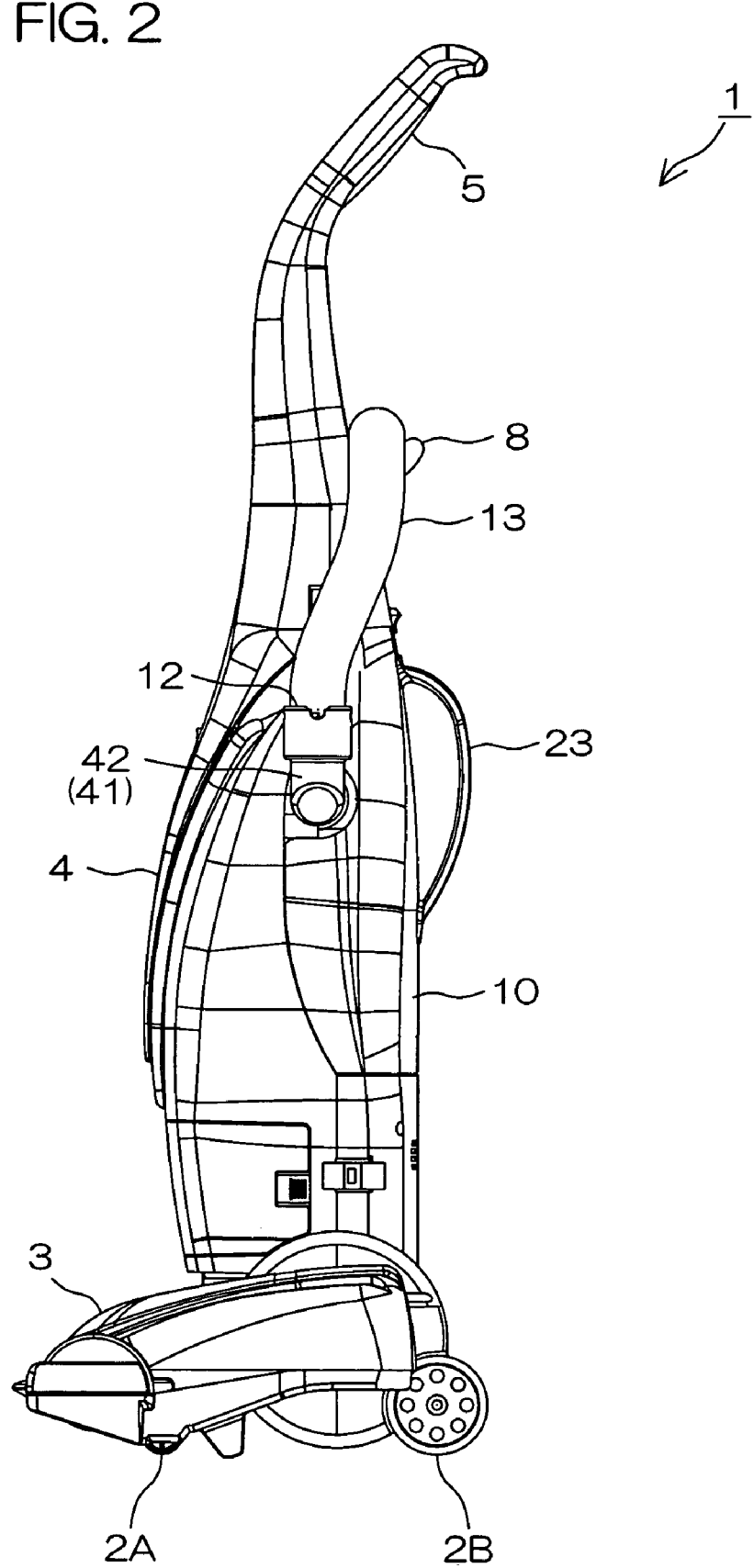
FIG. 2 is a left side view of the vacuum cleaner.
Figure 3:
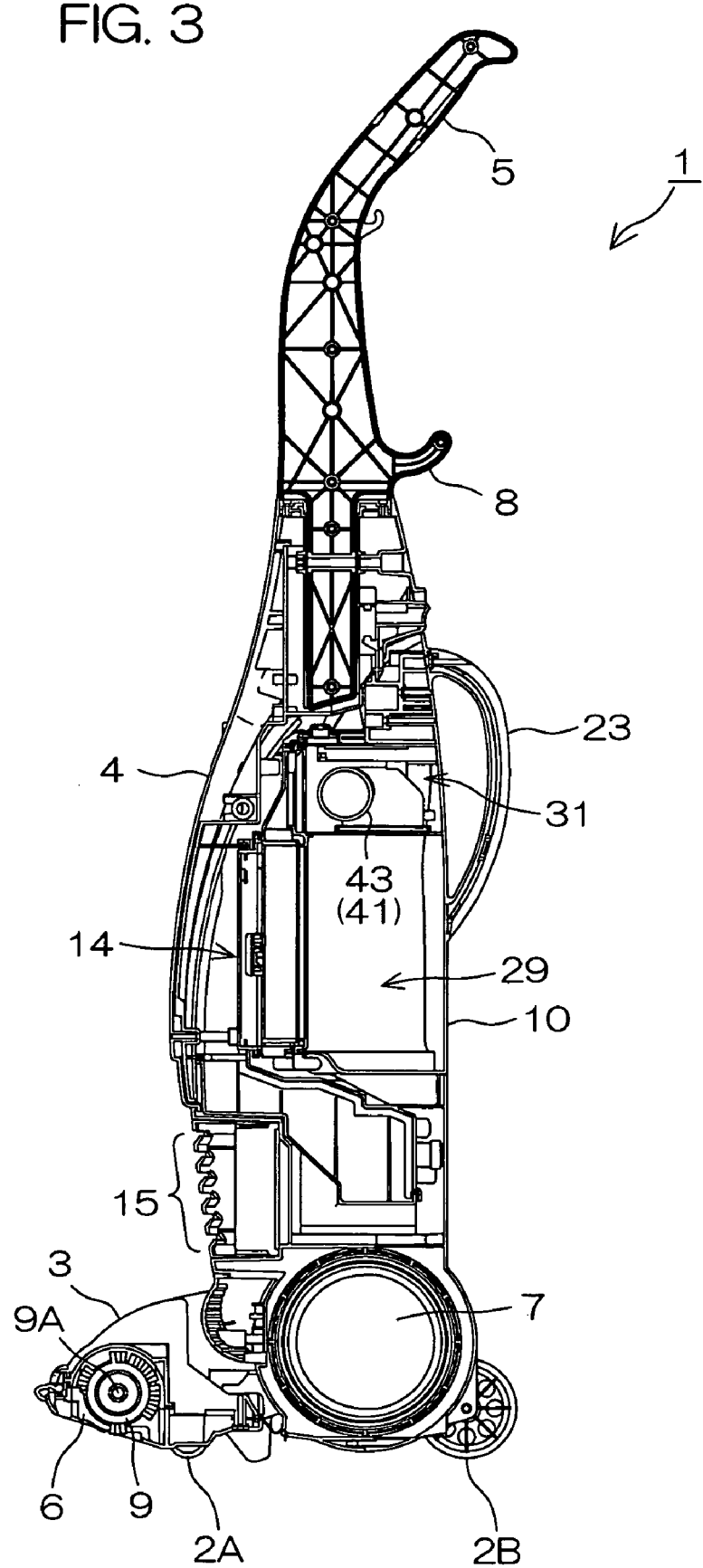
FIG. 3 is a sectional view of the vacuum cleaner taken along a vertical plane in a front-back direction when viewed from the left side.

FIG. 1 is a front view of a vacuum cleaner 1 in accordance with a first embodiment of the present invention. FIG. 2 is a left side view of the vacuum cleaner 1. FIG. 3 is a sectional view of the vacuum cleaner 1 taken along a vertical plane in a front-back direction when viewed from the left side.

With reference to FIGS. 1 to 3, the vacuum cleaner 1 is a so-called upright-type (vertical-type) cleaner having a suction section 3 moving along a floor surface and a long main unit 4, one end (lower end) of which is rotatably attached to the suction section 3. The vacuum cleaner 1 can be used with the main unit 4 being inclined rearwards at a prescribed angle (for example, 60 to 80 degrees) relative to the vertical direction by holding a handle 5 formed at the other end (upper end) of the main unit 4. A pair of right and left wheels 2A and 2B are rotatably attached to a lower part of the suction part 3 and the lower part of the main unit 4, respectively, and the vacuum cleaner 1 can be smoothly moved by rolling these wheels 2A and 2B along the floor surface. The vacuum cleaner 1 while not being used, the main unit 4 can be kept upright vertically relative to the suction section 3 (position shown in FIGS. 1 to 3).

A suction port 6 is formed on a front side of a bottom surface of the suction section 3. An electric blower 7 including a motor and a fan rotationally driven by the motor are arranged at the main unit 4 at a rear of the suction section 3. When cleaning is performed using the vacuum cleaner 1, dust on the floor surface opposed to the suction port 6 is sucked from the suction port 6 into the suction section 3 together with air outside of the suction port 6 by driving the electric fan 7.

A rotary brush 9 that can be rotated around a rotating shaft 9A extending in the horizontal direction is arranged on the front side in the suction section 3 and an outer circumferential face of the rotary brush 9 faces the suction port 6. Rotary force generated by the motor of the electric blower 7 is transmitted to the rotating shaft 9A of the rotary brush 9 through a transmission mechanism (for example, a pulley and a belt). Thus, when the electric blower 7 is driven, the rotary brush 9 is rotated, thereby facilitating an inflow of dust from the suction port 6 into the suction section 3 while preventing foreign particles from flowing in from the suction port 6 by the rotary brush 9. However, the rotary brush 9 may be rotationally driven due to wind pressure of air sucked from the suction port 6 into the suction section 3.

A dust collector 10 for capturing dust contained in air sucked from the suction part 3 is detachably attached to the main unit 4. An inlet port 12 is formed at the dust collector 10 and one end of a hose 13, the other end of which is coupled to the suction section 3, is connected to the inlet 12 of the dust collector 10. Thereby, air and dust sucked from the suction port 6 into the suction section 3 are sent toward the dust collector 10 through the hose 13 and taken into the dust collector 10 from the inlet 12. The dust sucked into the dust collector 10 together with air is captured in the process of passing through the dust collector 10 and only air is discharged from an outlet 14 formed on the front face of the dust collector 10. The air discharged from the outlet 14 of the dust collector 10 is emitted from an exhaust port 15 in a lower part of the front face of the main unit 4 to the outside through the main unit 4.

A hose support section 8 for supporting a middle part of the hose 13 from below is projectingly formed in an upper part of a rear face of the main unit 4. Two code winding sections 11 with a certain distance therebetween in the vertical direction are projectingly formed on a right side face of the main unit 4, and when the vacuum cleaner 1 is not used or a power cord is too long during use of the vacuum cleaner 1, the power code can be wound around the two code winding sections 11 so as to be hung between them.

Figure 4:
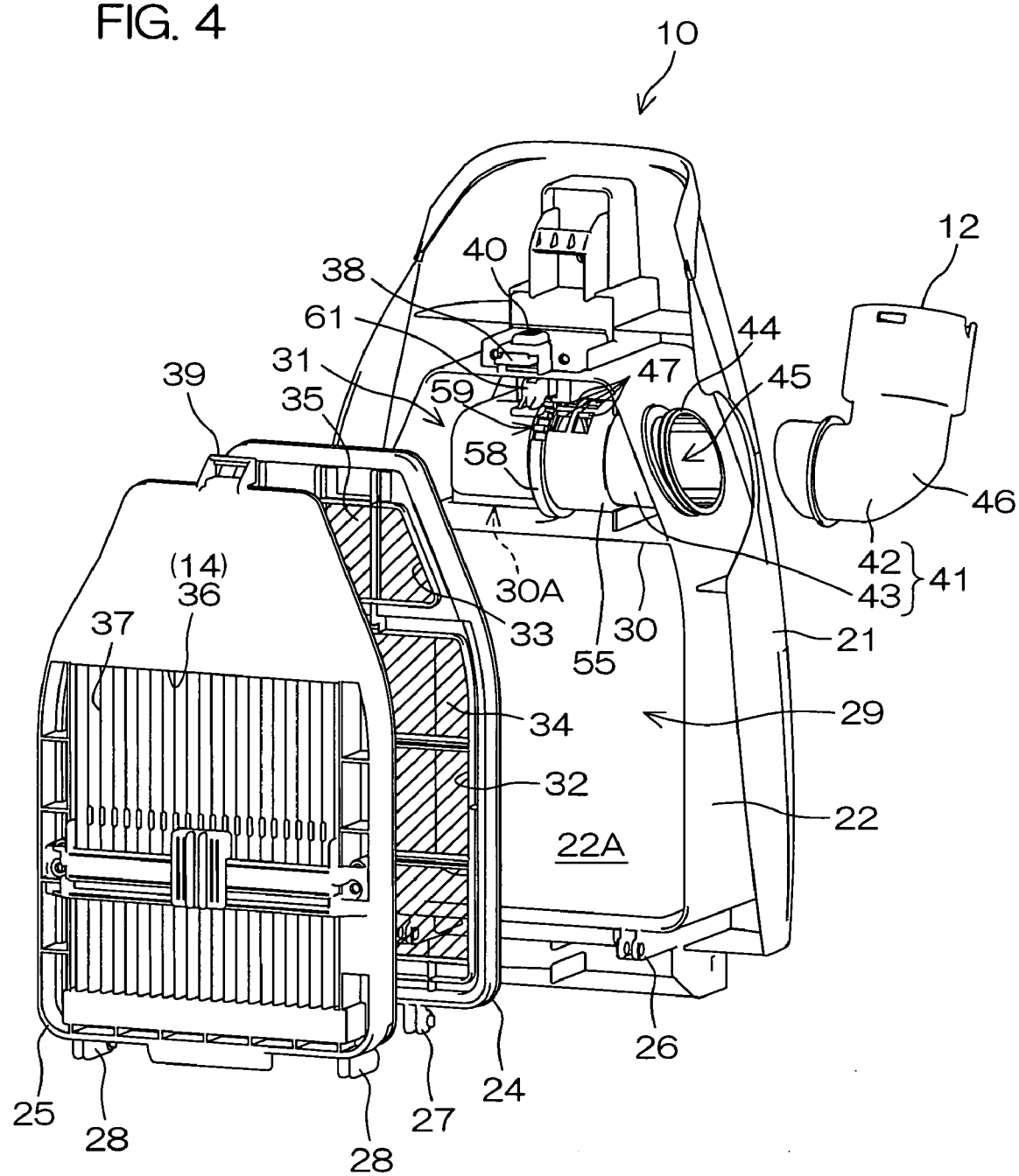
FIG. 4 is an exploded perspective view of a dust collector when viewed from obliquely above.
Figure 5A:
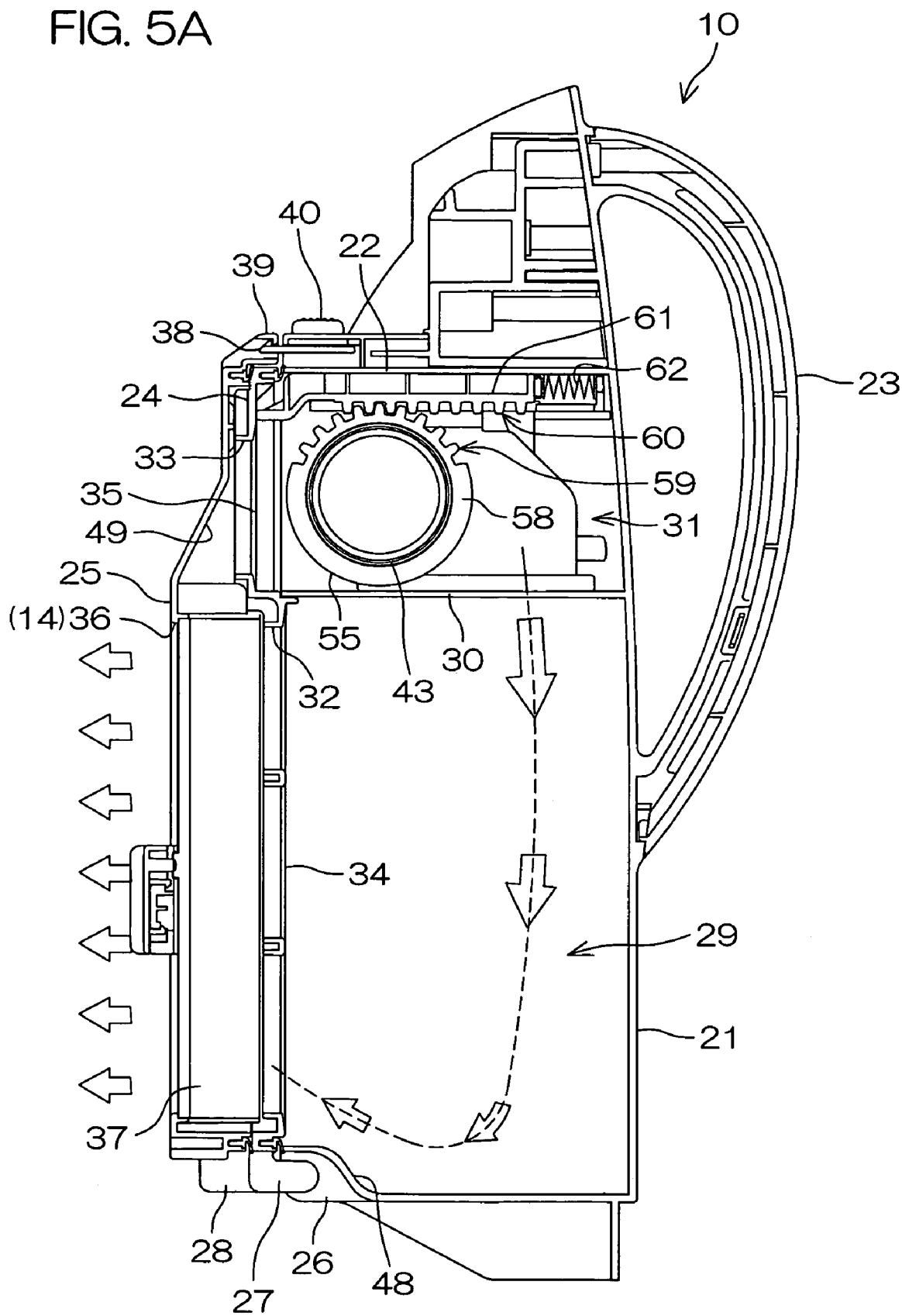
FIG. 5A is a sectional view of the dust collector taken along a vertical plane in the front-back direction when viewed from the left side showing a state where dust is hardly accumulated in the dust collector.
Figure 5B:
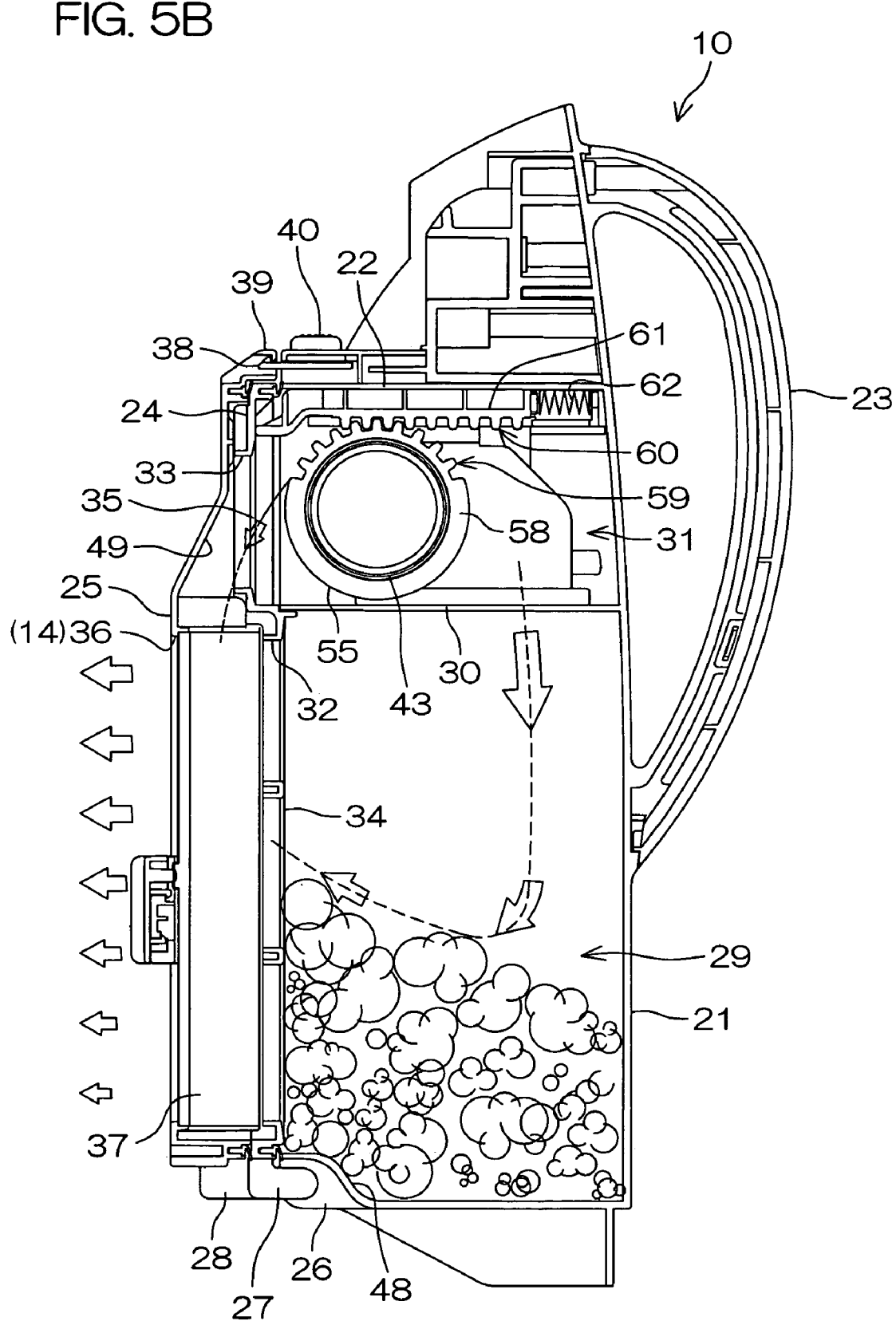
FIG. 5B is a sectional view of the dust collector taken along a vertical plane in the front-back direction when viewed from the left side showing a state where dust is accumulated in about one-half of the dust collector.
Figure 5C:
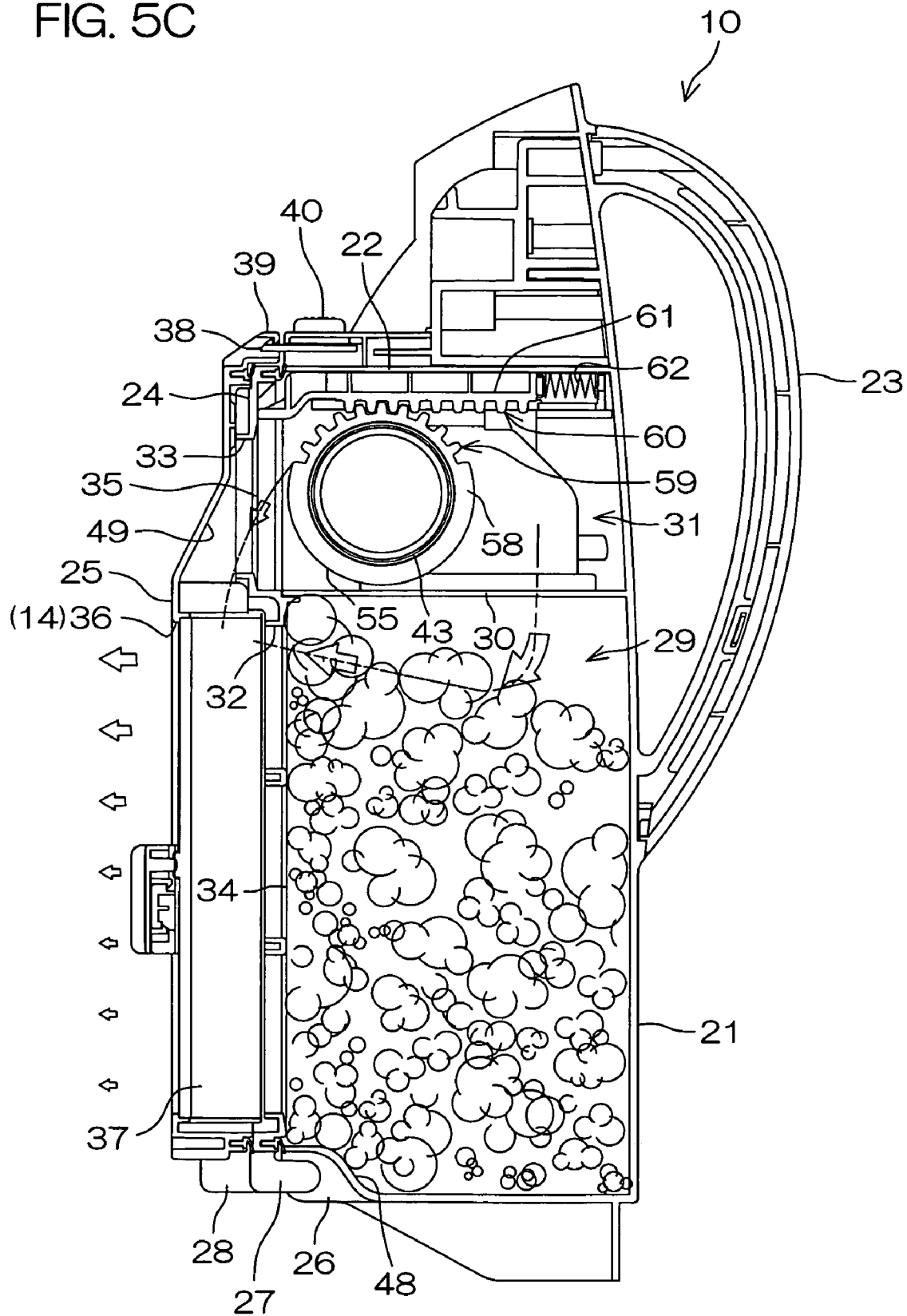
FIG. 5C is a sectional view of the dust collector taken along a vertical plane in the front-back direction when viewed from the left side showing a state where dust is almost fully accumulated in the dust collector.

FIG. 4 is an exploded perspective view of the dust collector 10 when viewed from obliquely above. FIGS. 5A to 5C are sectional views of the dust collector 10 taken along a vertical plane in the front-back direction when viewed from the left side. FIG. 5A shows a state where dust is hardly accumulated in the dust collector, FIG. 5B shows a state where dust is accumulated in about one-half of the dust collector and FIG. 5C shows a state where dust is almost fully accumulated in the dust collector.

With reference to FIGS. 4 and 5A to 5C, the dust collector 10 has a dual structure consisting of an outer case 21, a front face of which is opened, and an inner case 22 arranged inside of the outer case 21, a front face of which is opened. An arch-like grip section 23 for gripping when the dust collector 10 is attached or detached to or from the vacuum cleaner 1 is formed on a rear face of the outer case 21. An opening 22A on the front face of the inner case 22 can be opened or closed with two covers (a first cover 24 and a second cover 25) held so as to be rotatable around the same axial line extending at a lower end of the inner case 22 in the horizontal direction. A holding section 26 for rotatably holding the first cover 24 and the second cover 25 are formed on right and left sides of the lower end of the inner case 22, and attachment sections 27 and 28 each attached to the holding section 26 so as to be rotatable around the same axial line are formed on right and left sides of each lower edge of the first cover 24 and the second cover 25.

In the inner case 22 are arranged a first space 29 in the shape of an approximate rectangle when viewed from the front, which is formed from a center to a lower end thereof, and a second space 31 in the shape of an approximate trapezoid when viewed from the front, which is formed above the first space 29 across a partition wall 30. Vent holes 32 and 33 are formed on the first cover 24 in a closed state at positions opposed to the first space 29 and the second space 31, respectively. These vent holes 32 and 33 are covered with mesh filters 34 and 35 capable of capturing relatively large dust (rough dust). The second cover 25 in the closed state serves to cover the whole outside of the first cover 24 and a vent hole 36 is formed on the second cover 25 at a position opposed to the vent hole 32 of the first cover 24 in the closed state of the second cover 25. The vent hole 36 forms the outlet 14 of air from the dust collector 10 and is covered with a filter-paper filter 37 capable of capturing relatively small dust (fine dust).

An engagement section 39 engaged with an engagement claw 38 arranged at an upper end of the inner case 22 is formed at the upper end of the second cover 25 in the closed state. In the closed state of the second cover 25, the engagement claw 38 is engaged with the engagement section 39 with the first cover 24 being sandwiched between the opening 22A of the inner case 22 and the second cover 25. A pressing section 40 that can be pressed downwards from above is coupled to the engagement claw 38 and by pressing the pressing section 40 so as to move the engagement claw 38 downwards, engagement state of the engagement claw 38 with respect to the engagement section 39 can be released to open the first cover 24 and the second cover 25.

The first space 29 forms a dust collection chamber for capturing and accumulating dust sucked from the inlet 12 to the dust collector 10 therein. A substantially rectangular opening 30A is formed on the partition wall 30 and a guide pipe 41 for guiding air and dust sucked from the inlet 12 is connected to the opening 30A.

The guide pipe 41 includes an inlet pipe 42 forming the inlet 12 of the dust collector 10 and a lead-in pipe 43 for leading air and dust flowing in from the inlet pipe 42 to the dust collection chamber 29. The lead-in pipe 43 extends in the second space 31 of the inner case 22 in the horizontal direction, one end thereof is connected to the opening 30A on the partition wall 30 and the other end thereof is opposed to a circular opening 45 formed on the left side face of the inner case 22. The opening 45 is provided with an annular packing 44, the other end of the lead-in pipe 43 comes into contact with the packing 44 from the right side and one end of the inlet pipe 42 comes into contact with the packing 44 from the left side, so that the inlet pipe 42 and the lead-in pipe 43 can be connected to each other with the bonded part being sealed. The inlet pipe 42, formed substantially L-shaped, has a bent section (curved or crooked section) 46 on the way and the other end thereof forms the inlet 12.

Normally, air sucked from the inlet 12 flows into the dust collection chamber 29 through the guide pipe 41. Subsequently, rough dust in the air is captured with the mesh filter 34 when the air passes through the vent hole 32 of the first cover 24 and then, fine dust in the air is captured with the filter-paper filter 37 when the air passes through the vent hole 36 of the second cover 25. Finally, the air is exhausted. Thereby, the dust (rough dust) sucked from the inlet 12 together with air is accumulated in the dust collection chamber 29. The dust collector 10 does not adopt a commercially available disposable paper pack and the dust accumulated in the dust collection chamber 29 can be removed by opening the first cover 24 and the second cover 25 to open the opening 22A of the inner case 22.

A plurality of vent holes 47 are formed along the path of the lead-in pipe 43. Thus, it becomes possible to separate a part of air coming from the inlet 12 and allow the air to flow from the vent holes 47 into the second space 31, thereby guiding the air directly to the outlet 14 by bypassing the dust collection chamber 29. That is, the second space 31 forms a bypass passage for ensuring the flow of air in the case where dust is accumulated in the dust collection chamber 29 to some extent as shown in FIG. 5B, and the flow of air that passes through the dust collection chamber 29 toward the outlet 14 is deteriorated. The air that flows into the bypass passage 31 from the vent holes 47 of the lead-in pipe 43 passes through the vent hole 33 of the first cover 24 (mesh filter 35), moves downwards from the upper side in a space between the first cover 24 and the second cover 25 to reach the filter-paper filter 37. Then, the air passes through the filter-paper filter 37 and is discharged from the outlet 14. And as shown in FIG. 5C, even when dust is further accumulated in the dust collection chamber 29 and the dust collection chamber 29 is almost filled with dust, as long as the mesh filter 34 is not clogged, the flow of air can be ensured and the dust can be compressed to improve dust collection efficiency.

An inclined plane 48 inclined upwards as it goes ahead from the rear side is formed at a front end of an inner bottom face of the dust collection chamber 29. The inclined plane 48 is inclined with respect to a direction (horizontal direction) perpendicular to a direction in which air and dust flow into the dust collection chamber 29 from the guide pipe 41 (downward direction). Therefore, since air flowing into the dust collection chamber 29 can be rectified along the inclined plane 48 formed on the dust collection chamber 29 and then satisfactorily guided to the outlet 36 as shown by arrows outline with a blank inside in FIG. 5A, suction performance can be improved and the dust can be efficiently accumulated on the bottom face of the dust collection chamber 29. Especially, since pressure applied to the dust accumulated in a front lower part of the dust collection chamber 29 (a part immediately rear of the inclined plane 48) can be reduced, a portion behind the outlet 14 can be prevented from being clogged with the dust accumulated in the part, thereby effectively improving suction performance.

Also, an inclined plane 49 inclined downwards toward the front as it goes downwards from above is formed on the second cover 25 in the closed state at a position opposed to the vent hole 33 of the first cover 24. The inclined plane 49 is inclined with respect to a direction (vertical direction) perpendicular to a direction in which air and dust that flow out of the vent holes 47 of the lead-in pipe 43 move toward the second cover 25 (forward direction). Accordingly, as shown arrows outline with a blank inside in FIGS. 5B and 5C, since the air passing through the bypass passage 31 can be satisfactorily guided to the outlet 36 along the inclined plane 49 formed on the second cover 25, suction performance can be improved.

Figure 6:
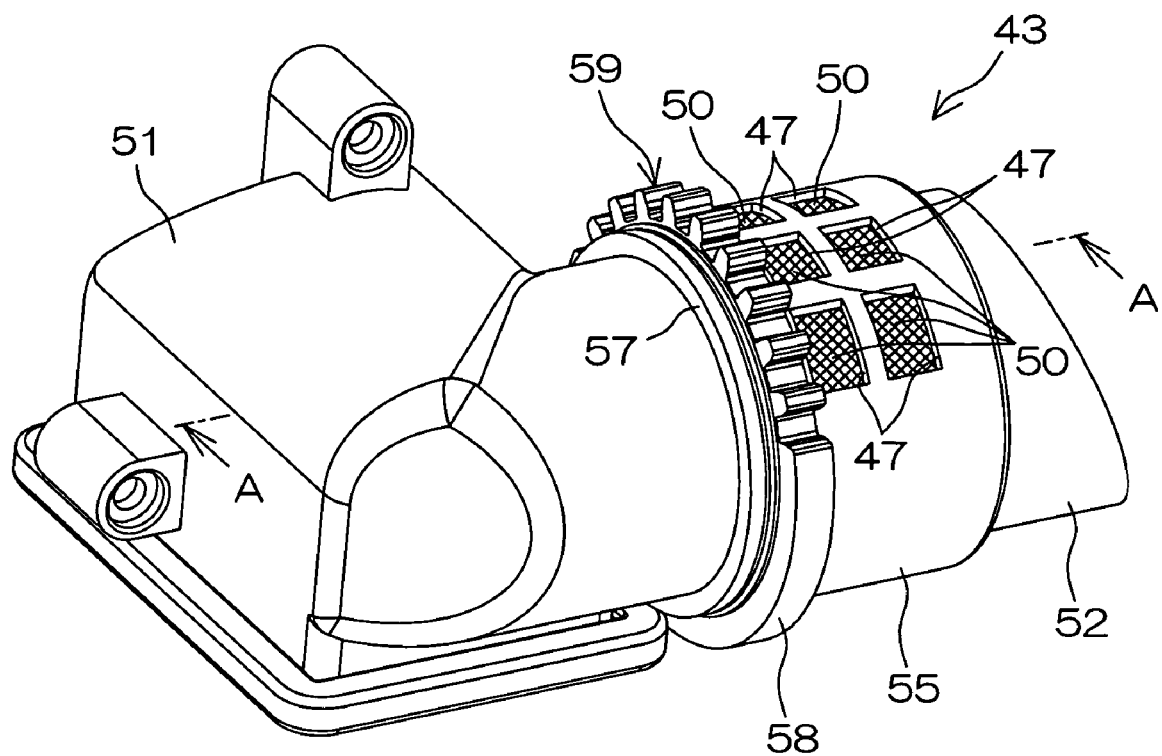
FIG. 6 is a perspective view of a lead-in pipe when viewed from obliquely above.
Figure 7:
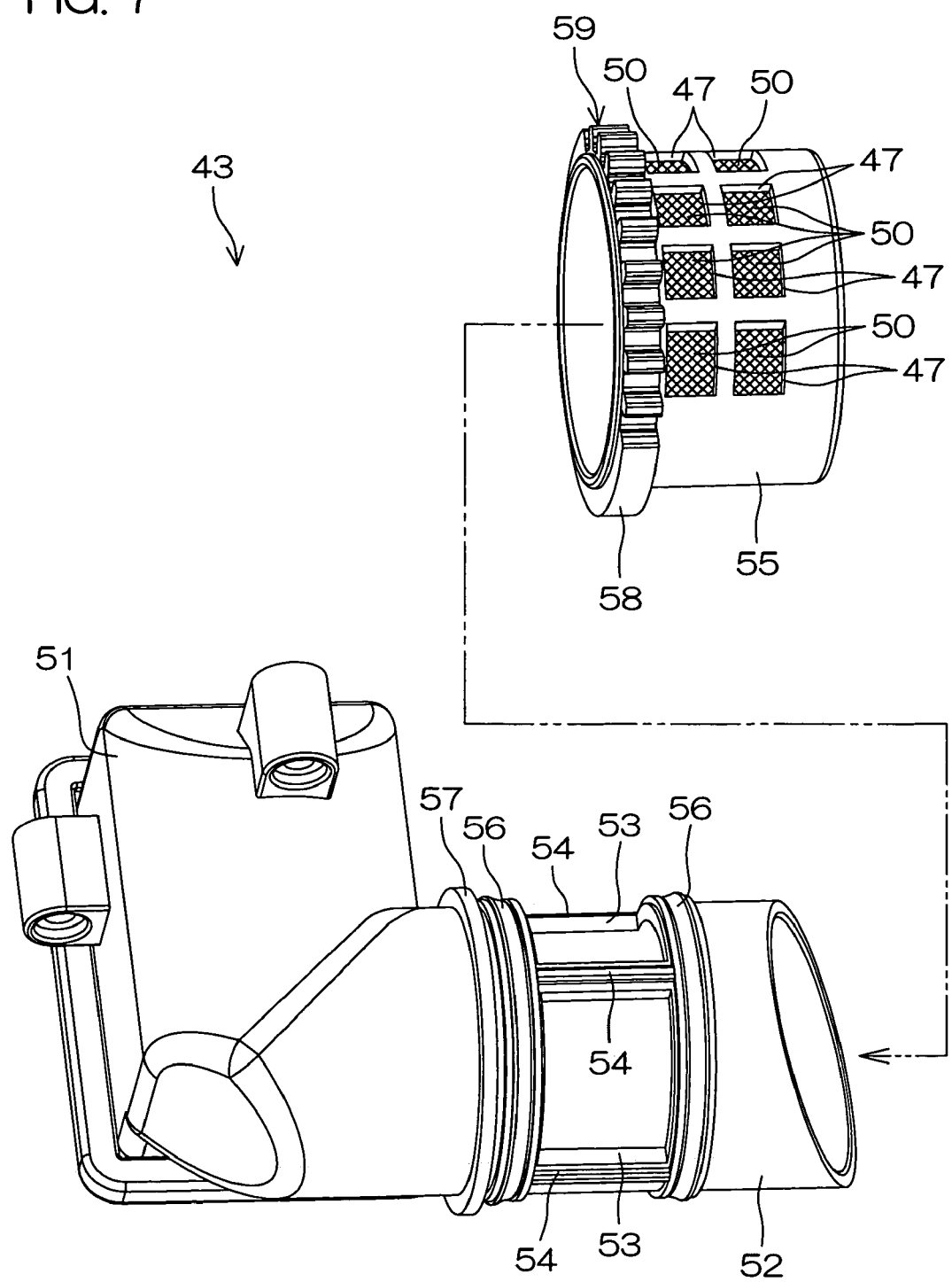
FIG. 7 is an exploded perspective view of the lead-in pipe when viewed from obliquely above.
Figure 8:
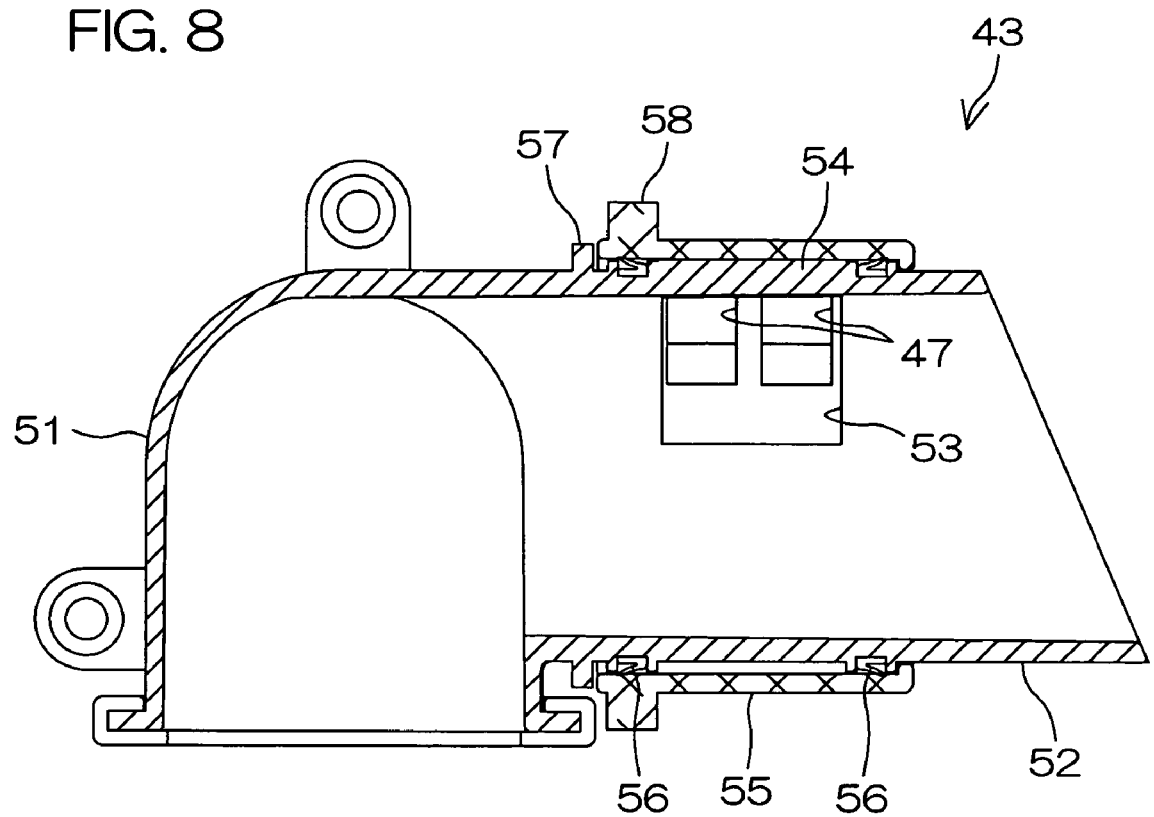
FIG. 8 is a sectional view of the lead-in pipe taken along a line A-A of FIG. 6.

FIG. 6 is a perspective view of the lead-in pipe 43 when viewed from obliquely above. FIG. 7 is an exploded perspective view of the lead-in pipe 43 when viewed from obliquely above. FIG. 8 is a sectional view of the lead-in pipe 43 taken along a line A-A of FIG. 6.

With reference to FIGS. 4 to 8, the lead-in pipe 43 in the shape of a hollow rectangular parallelepiped, a lower face of which is opened, has a connection section 51 connected to the opening 30A of the partition wall 30 and a cylindrical linear section 52 that linearly projects from a left end face of the connection section 51 to the right in the horizontal direction. A plurality of substantially rectangular openings 53 (for example, two) having a prescribed width in the axial direction are formed on a circumferential face in the middle of the linear section 52 in the axial direction, and arranged in parallel in the circumferential direction. A protrusion 54 that extends in a direction intersecting with (for example, perpendicular to) the circumferential direction of the linear section 52 and projects outwards from the outer circumferential face of the linear section 52 are formed at each of end edges of the openings 53 in the circumferential direction (more specifically, three end edges in total: an end edge between one opening 53 and the other opening 53, and two end edges of the openings 53 on the opposite side of the former end edge).

The linear section 52 is coated with a cylindrical passage member 55 so as to cover an outer circumference of the region in which the openings 53 are formed. An annular packing 56 is attached to both right and left sides of the openings 53 on the outer circumferential face of the linear section 52, respectively, so as to fill a gap between the passage member 55 and the linear section 52. An annular rib 57 is protrusively formed on the right side of the openings 53 of the linear section 52 (on the right side of the right packing 56) in the circumferential direction. The passage member 55 is covered on the linear section 52 from the left side so that an end face thereof may come into contact with (or may come close to) the annular rib 57. In this state, the passage member 55 is arranged so that its axial line may come along an extending direction of the linear section 52 (horizontal direction) and is held to be rotatable around the axial line.

The vent holes 47 are comprised of substantially rectangular holes formed on the passage member 55. When the dust collector 10 is used, by positioning the vent holes 47 on the upper side so as to be opposed to the openings 53 of the linear section 52, air flowing in the lead-in pipe 43 can be flown to the outside (the side of the bypass passage 31) through the openings 53 and the vent holes 47 in the case where dust is accumulated in the dust collection chamber 29 to some extent.

The vent holes 47 formed on the passage member 55 are covered with mesh filters 50 and dust moving from the lead-in pipe 43 toward the bypass passage 31 together with air can be captured with the mesh filters 50. In the state where the passage member 55 is attached to the linear section 52, each protrusion 54 formed on the outer circumferential face of the linear section 52 abuts on the mesh filters 50 and when the passage member 55 is rotated around the axial line, each protrusion 54 is in slidingly contact with the mesh filters 50.

A flange part 58 that projects from an end face facing the annular rib 57 formed on the linear section 52 in the radial direction is formed on the outer circumferential face of the passage member 55. A plurality of gear teeth 59 are formed on an outer circumferential face of the flange section 58 lateral to the region in which the vent holes 47 of the passage member 55 are formed (that is, an upper portion of the flange section 58 in the state where the vent holes 47 are opposed to the openings 53). A rack 61 having a plurality of teeth 60 formed on its bottom face in the front-back direction is arranged on the inner upper face of the inner case 22 of the dust collector 10 so as to be slidable in the front-back direction (refer to FIGS. 4 and 5A to 5C). In the state where the lead-in pipe 43 is arranged in the bypass passage 31, the gear teeth 59 formed on the flange part 58 of the passage member 55 are engaged with the teeth 60 of the rack 61. Thus, when the rack 61 is slid in the front-back direction, the passage member 55 coupled to the rack 61 through the teeth 59 and 60 can be rotated.

In this embodiment, the part connecting the guide pipe 41 to the bypass passage 31 may be shaped of a cylinder rather than a truncated cone. In the case where the part connecting the guide pipe 41 to the bypass passage 31 is shaped of a cylinder instead of a truncated cone, a narrowed portion with a smaller inner diameter is not formed at the guide pipe 41. Thus, lowering of suction force caused by pressure loss in the guide pipe 41 can be prevented.

Also, as compared with the case of the truncated cone shape, the cylindrical shape of the part connecting the guide pipe 41 to the bypass passage 31 enables reduction in space for arranging them. Therefore, the dust collection chamber 29 can be made larger, the amount of dust which can be accumulated in the dust collection chamber 29 can be increased, thereby suppressing lowering of suction force. Thus, by preventing lowering of the suction force, suction performance can be improved.

The passage member 55 forms a cylindrical filter part arranged so that its axial line may come along the extending direction of the linear section 52. The vent holes 47 formed on the circumferential face of the passage member 55 and the mesh filters 50 formed on the vent holes 47 extend in parallel to the direction in which air and dust flow in the guide pipe 41. Accordingly, as the compared with the case where the filter section is formed in the shape of a truncated cone, dust is more difficult to adhere to the mesh filters 50 and when a foreign particle having high specific gravity (for example, metal piece) flows into the guide pipe 41, it can effectively prevent the foreign particle from hitting against the mesh filters 50, damaging the mesh filters 50. As described above, since it can be prevented that the flow of air to the bypass passage 31 is deteriorated due to dust adhered to the mesh filters 50 and that a foreign particle flows into and clogs up the bypass passage 31 due to damage of the mesh filters 50, suction performance can be improved.

Figure 9:
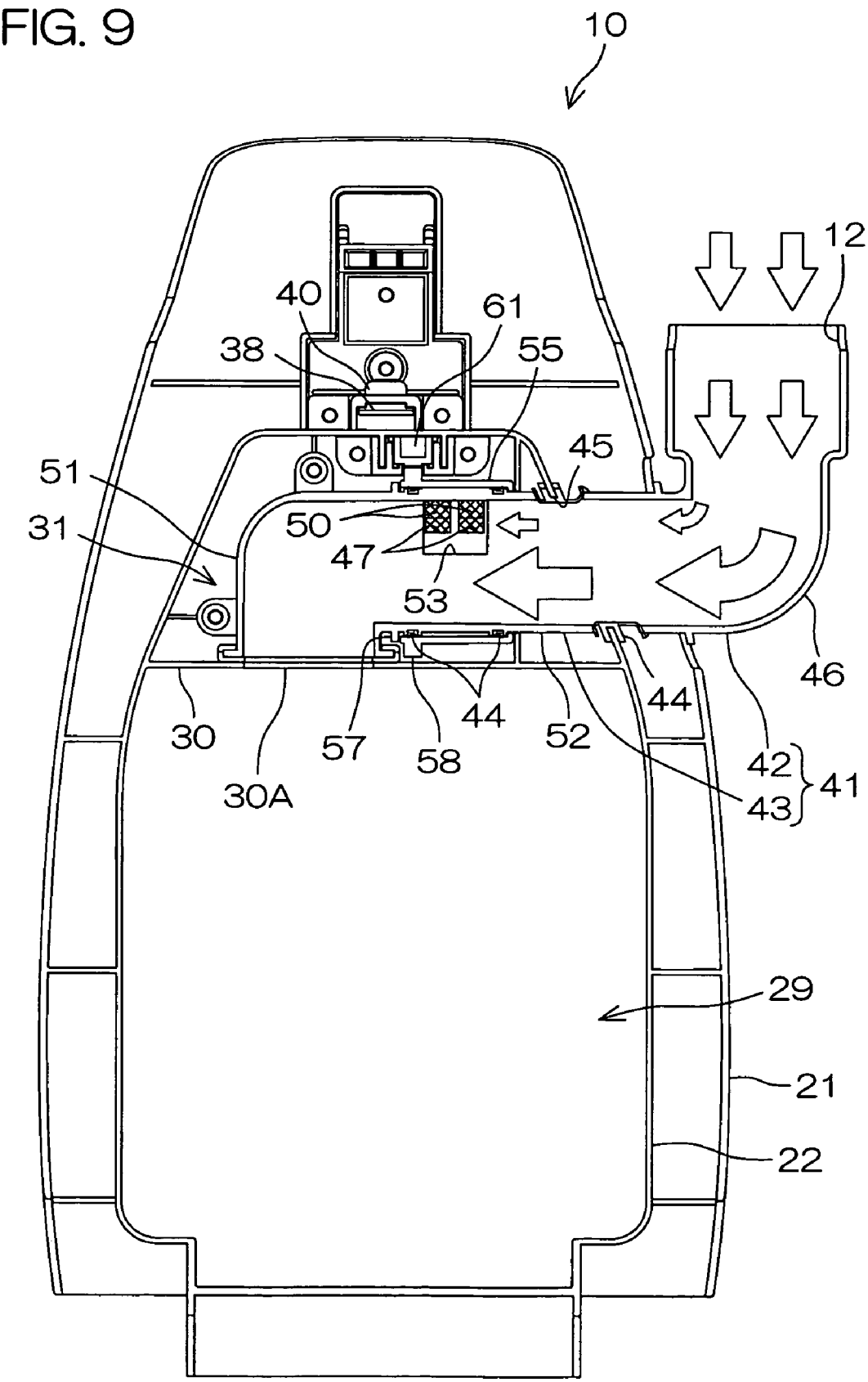
FIG. 9 is a sectional view of the dust collector taken along a vertical plane in the horizontal direction when viewed from the front showing a state where air and dust are sucked from an inlet into the dust collector.

FIG. 9 is sectional view of the dust collector 10 taken along a vertical plane in the horizontal direction when viewed from the front showing a state where air and dust are sucked from the inlet 12 into the dust collector 10.

With reference to FIG. 9, the inlet pipe 42 is connected to the lead-in pipe 43 so that the inlet 12 may be oriented upwards. Air and dust sucked from the inlet 12 move downwards in the inlet pipe 42 and go to the right through the bent section (curved or crooked section) 46. Since centrifugal force is applied to dust sucked together with air when they pass through the bent section 46, as shown by arrows outline with a blank inside in FIG. 9, most of dust passes through an outer portion in the inlet pipe 42 (a portion to which centrifugal force is applied). Thus, dust that has passed through the bent section 46 of the inlet pipe 42 goes through a lower portion of the linear section 52 of the lead-in pipe 43. At this time, as specific gravity of dust is increased, dust passes the outer portion in the inlet pipe 42 and moves to the lower portion of the linear section 52 of the lead-in pipe 43 more easily.

In this embodiment, when the dust collector 10 is used, by positioning the vent holes 47 on the upper side, the vent holes 47 are located at the position on the opposite side (inner side) of a direction in which centrifugal force is applied to dust passing through the bent portion 46. That is, as shown by arrows outline with a blank inside in FIG. 9, the vent holes 47 are arranged in a region in which the amount of dust passing through the lead-in pipe 43 is small.

With such configuration, since dust passing through the guide pipe 41 is difficult to head for the vent holes 47, dust is difficult to adhere to the mesh filters 50 covering the vent holes 47 and when a foreign particle having high specific gravity (for example, metal piece) flows into the guide pipe 41, it can effectively prevent the foreign particle from hitting against the mesh filters 50, damaging the mesh filters 50. As described above, since it can be prevented that the flow of air to the bypass passage 31 is deteriorated due to dust adhered to the mesh filters 50 and that a foreign particle flows into and clogs up the bypass passage 31 due to damage of the mesh filters 50, suction performance can be improved.

Especially in this embodiment, since the vent holes 47 are arranged downstream of the bent section 46 in the guide pipe 41 within a certain distance from the bent section 46, as compared with the configuration in which the vent holes are arranged upstream of the bent section 46 in the guide pipe 41, dust is harder to move toward the vent holes 47 and thus suction performance can be effectively improved.

Furthermore, since air and dust sucked from the inlet 12 go downwards in the inlet pipe 42 and then move in the horizontal direction (to the right) through the bent section 46, dust is easy to pass through the outer side in the inlet pipe 42 due to its gravity. Therefore, dust is even harder to head for the vent holes 47 and thus suction performance can be improved more effectively.

However, the vent holes 47 are not necessarily located a certain distance away from the bent section 46 as shown in FIG. 9 and for example, they may be arranged immediately downstream of the bent section 46.

Figure 10:
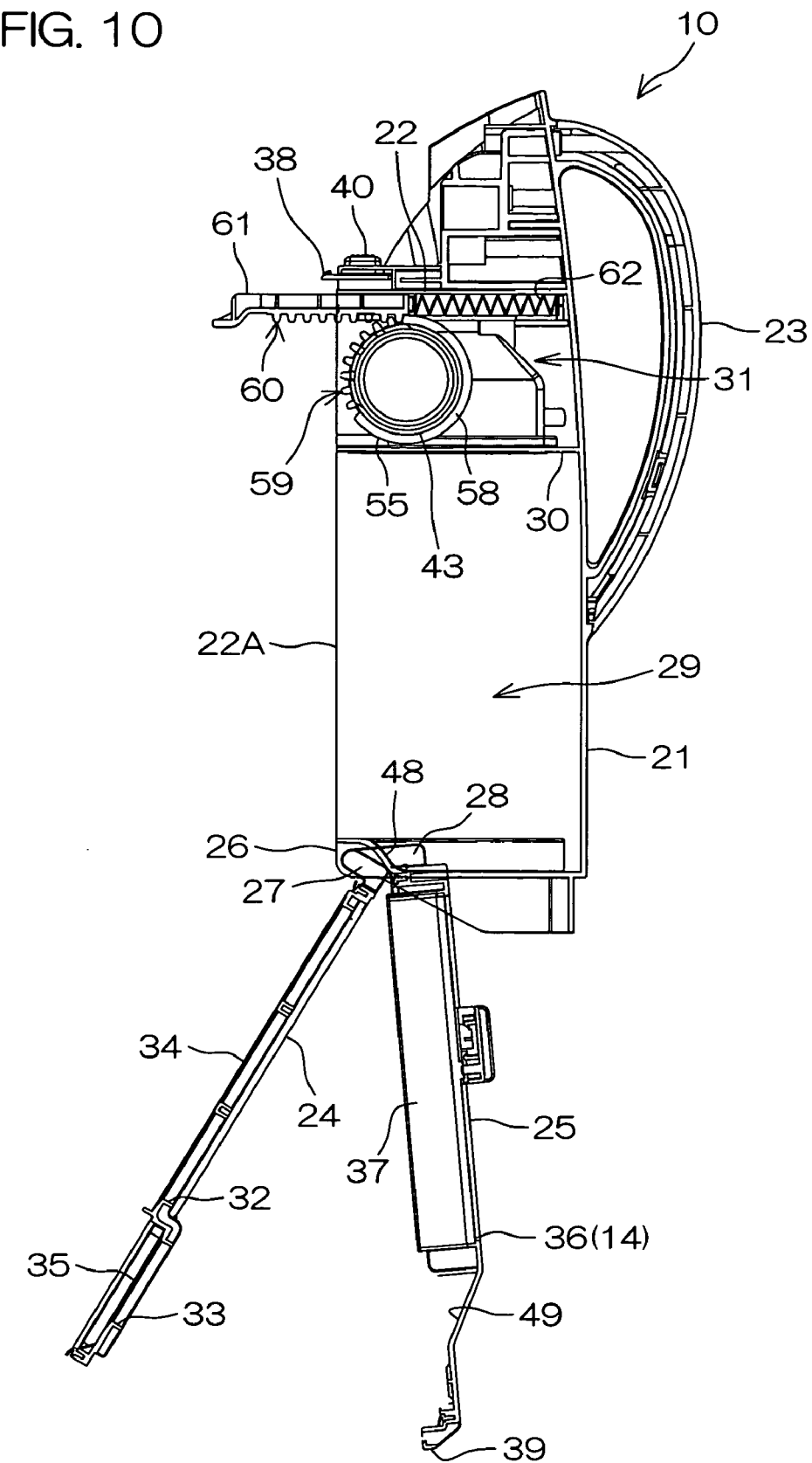
FIG. 10 is a sectional view of the dust collector taken along a vertical plane in the front-back direction when viewed from the left side showing a state where a first cover and a second cover of the dust collector are opened.

FIG. 10 is sectional view of the dust collector 10 taken along a vertical plane in the front-back direction when viewed from the left side showing a state where the first cover 24 and the second cover 25 of the dust collector 10 are opened.

The rack 61 engaging with the gear teeth 59 of the passage member 55 is forced to move frontward by a powering means (for example, a spring 62). Accordingly, in the state where the first cover 24 and the second cover 25 are closed as shown in FIGS. 5A to 5C, a front end of the rack 61 is in contact with the first cover 24 and thus the rack 61 is pressed backwards against powering force of the spring 62. When the pressed section 40 is pressed to transfer the engaging claw 38 downwards in this state, an engagement state of the engaging claw 38 with the engagement section 39 is released and the first cover 24 and the second cover 25 are pressed up by the rack 61 forced to move frontward so as to be automatically opened.

In this embodiment, in the state where the first cover 24 and the second cover 25 are opened to the maximum, the covers 24 and 25 are held at different rotating angles, respectively, as shown in FIG. 10. With such configuration, when the first cover 24 and the second cover 25 are opened to take out dust accumulated in the dust collection chamber 29, the covers 24 and 25 can be held at different rotating angles, respectively, so as not to overlap with each other. Therefore, when the first cover 24 and the second cover 25 are opened to take out dust accumulated in the dust collection chamber 29, dust adhered to the dust collection filters (mesh filters 34 and 35 and filter-paper filter 37) equipped with the first cover 24 and the second cover 25 can be easily removed, resulting in easy maintenance.

Furthermore, since the passage member 55 is held so as to be rotatable around the axial line, maintenance such as removal of dust adhered to the mesh filters 50 can be easily performed by rotating the passage member 55.

Especially, since the passage member 55 can be rotated simultaneously as the first cover 24 and the second cover 25 are opened or closed, time and effort for rotating the passage member 55 can be saved, resulting in easier maintenance.

Furthermore, when the passage member 55 is rotated, each of the protrusions 54 formed on the outer circumferential face of the linear section 52 of the lead-in pipe 43 is slidingly in contact with the mesh filters 50, thereby shaking dust adhered to the mesh filters 50 off. Thus, the dust adhered to the mesh filters 50 can be easily removed, resulting in easy maintenance.

When the first cover 24 and the second cover 25 are opened as shown in FIG. 10, the rack 61 is projected ahead of the dust collector 10 by powering force of the spring 62. At this time, the passage member 55 that engages with the rack 61 through the teeth 60 and 59 rotates in the counter clockwise direction in FIG. 10. Thus, in the state where the first cover 24 and the second cover 25 are closed, the vent holes 47 face upwards and are not opposed to the opening 22A of the inner case 22. However, when the first cover 24 and the second cover 25 are opened, the passage member 55 is rotated and the vent holes 47 face forwards and are opposed to the opening 22A of the inner case 22. With such configuration, by opening the first cover 24 and the second cover 25, the passage member 55 can be rotated, thereby allowing the vent holes 47 to be opposed to the opening 22A of the inner case 22. Accordingly, merely by opening the first cover 24 and the second cover 25, the passage member 55 can be rotated to a position at which maintenance such as removal of dust adhered to the mesh filters 50 is easily performed, resulting in much easier maintenance.

Figure 11:
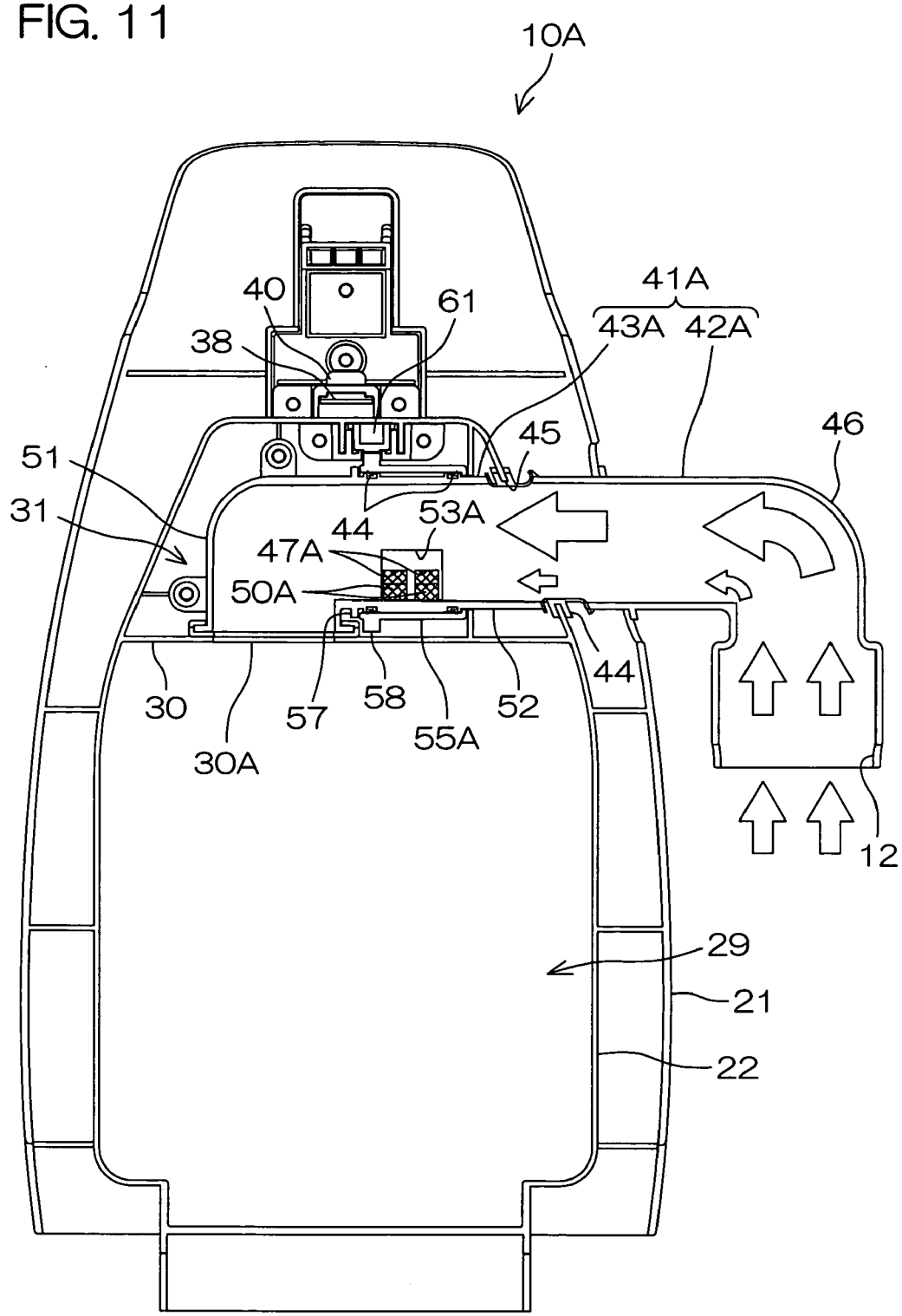
FIG. 11 is a sectional view of a dust collector in accordance with a first modified example taken along a vertical plane in the horizontal direction when viewed from the front.

FIG. 11 is a sectional view of a dust collector 10A in accordance with a first modified example taken along a vertical plane in the horizontal direction when viewed from the front.

The dust collector 10A in the modified example is different from the dust collector 10 in the above-mentioned embodiment in the configuration of a lead-in pipe 43A and position of the inlet pipe 42A attached to the lead-in pipe 43A. Since other components of the dust collector 10A are similar to those of the dust collector 10 in the above-mentioned embodiment, the same reference numerals are given to the similar components and description thereof is omitted.

With reference to FIG. 11, as distinct from the dust collector 10, in the dust collector 10A, a plurality of substantially rectangular openings 53A (for example, two) each having a prescribed width in the axial direction are formed on a lower side of a circumferential face in the middle of the linear section 52 of the lead-in pipe 43A in the axial direction, and arranged in parallel in the circumferential direction (In FIG. 11, only one opening 53A is shown).

The linear section 52 is coated with a cylindrical passage member 55A so as to cover an outer circumference of the region in which the openings 53A are formed. The passage member 55A is arranged so that its axial line may come along the extending direction of the linear section 52 (horizontal direction) and is held so as to be rotatable around the axial line. A plurality of substantially rectangular holes are formed on a circumferential face of the passage member 55A and these plural holes constitute vent holes 47A.

When the dust collector 10A is used, by positioning the vent holes 47A on the lower side so as to be opposed to the openings 53A of the linear section 52, air flowing in the lead-in pipe 43A can be flown to the outside (the side of the bypass passage 31) through the openings 53A and the vent holes 47A in the case where dust is accumulated in the dust collection chamber 29 to some extent. The vent holes 47A formed on the passage member 55A are covered with mesh filters 50A and dust moving from the lead-in pipe 43A toward the bypass passage 31 together with air can be captured with the mesh filters 50A.

On the outer circumferential face of the flange section 58, which is formed on an end face of the linear section 52 as opposed to the annular rib 57, lateral to the region in which the vent holes 47A of the passage member 55A are not formed (that is, an upper portion of the flange section 58 in the state where the vent holes 47 are opposed to the openings 53A) are formed a plurality of gear teeth (not shown) in the circumferential direction. The teeth formed on the flange portion 58 of the passage member 55A are engaged with the teeth of the rack 61 arranged on the inner upper face of the inner case 22 of the dust collector 10 (upper portion of the bypass passage 31) so as to be slidable in the front-back direction. Thus, when the rack 61 is slid in the front-back direction, the passage member 55A coupled to the rack 61 can be rotated.

In the dust collector 10A, the inlet pipe 42A is connected to the lead-in pipe 43A so that the inlet 12 may be oriented downwards. Thus, one end of the hose 13, the other end of which is coupled to the suction section 3, is fitted into the inlet 12 from below.

Air and dust sucked from the inlet 12 move upwards in the inlet pipe 42A and go to the right through the bent section (curved or crooked section) 46. Since centrifugal force is applied to dust sucked together with air when they pass through the bent section 46, as shown by arrows outline with a blank inside in FIG. 11, most of dust passes through an outer portion in the inlet pipe 42A (a portion to which centrifugal force is applied). Thus, the dust that has passed through the bent section 46 of the inlet pipe 42A goes through an upper portion of the linear section 52 of the lead-in pipe 43A.

In this modified example, when using the dust collector 10A, by positioning the vent holes 47A on the lower side, the vent holes 47A are located at the position on the opposite side (inner side) of a direction in which centrifugal force is applied to dust passing through the bent portion 46. That is, as shown by arrows outline with a blank inside in FIG. 11, the vent holes 47A are arranged in a region in which the amount of dust passing through the lead-in pipe 43A is small.

With the configuration of the dust collector 10A in accordance with this modified example, since dust passing through the guide pipe 41A including the inlet pipe 42A and the lead-in pipe 43A is difficult to head for the vent holes 47, dust is difficult to adhere to the mesh filters 50A covering the vent holes 47 and when a foreign particle having high specific gravity (for example, metal piece) flows into the guide pipe 41A, it can effectively prevent the foreign particle from hitting against the mesh filters 50, damaging the mesh filters 50A. As described above, since it can be prevented that the flow of air to the bypass passage 31 is deteriorated due to dust adhered to the mesh filters 50A and that a foreign particle flows into and clogs up the bypass passage 31 due to damage of the mesh filters 50A, suction performance can be improved.

Especially in this modified example, since the vent holes 47A are arranged downstream of the bent section 46 in the guide pipe 41A within a certain distance from the bent section 46, as compared with the configuration in which the vent holes are arranged upstream of the bent section 46 in the guide pipe 41A, dust is harder to move toward the vent holes 47A and thus suction performance can be effectively improved.

However, the vent holes 47A are not necessarily located a certain distance away from the bent section 46 as shown in FIG. 11, and for example, they may be arranged immediately downstream of the bent section 46.

Figure 12:
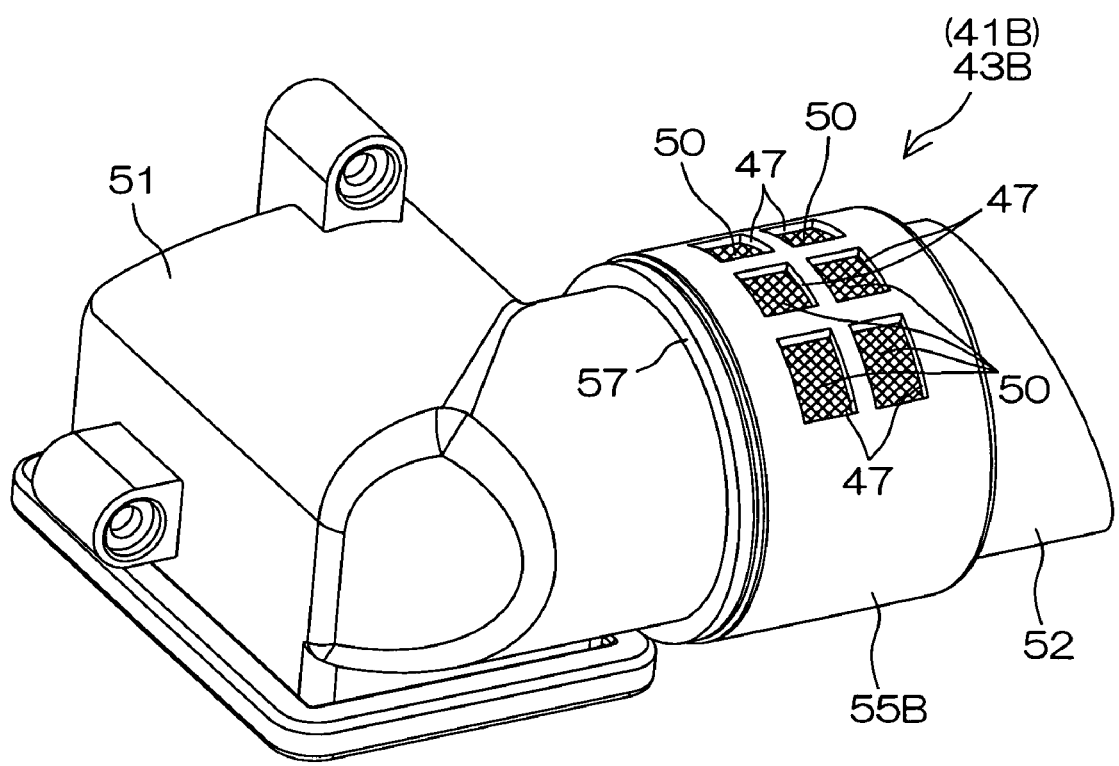
FIG. 12 is a perspective view of a lead-in pipe in accordance with a second modified example when viewed from obliquely above.
Figure 13:
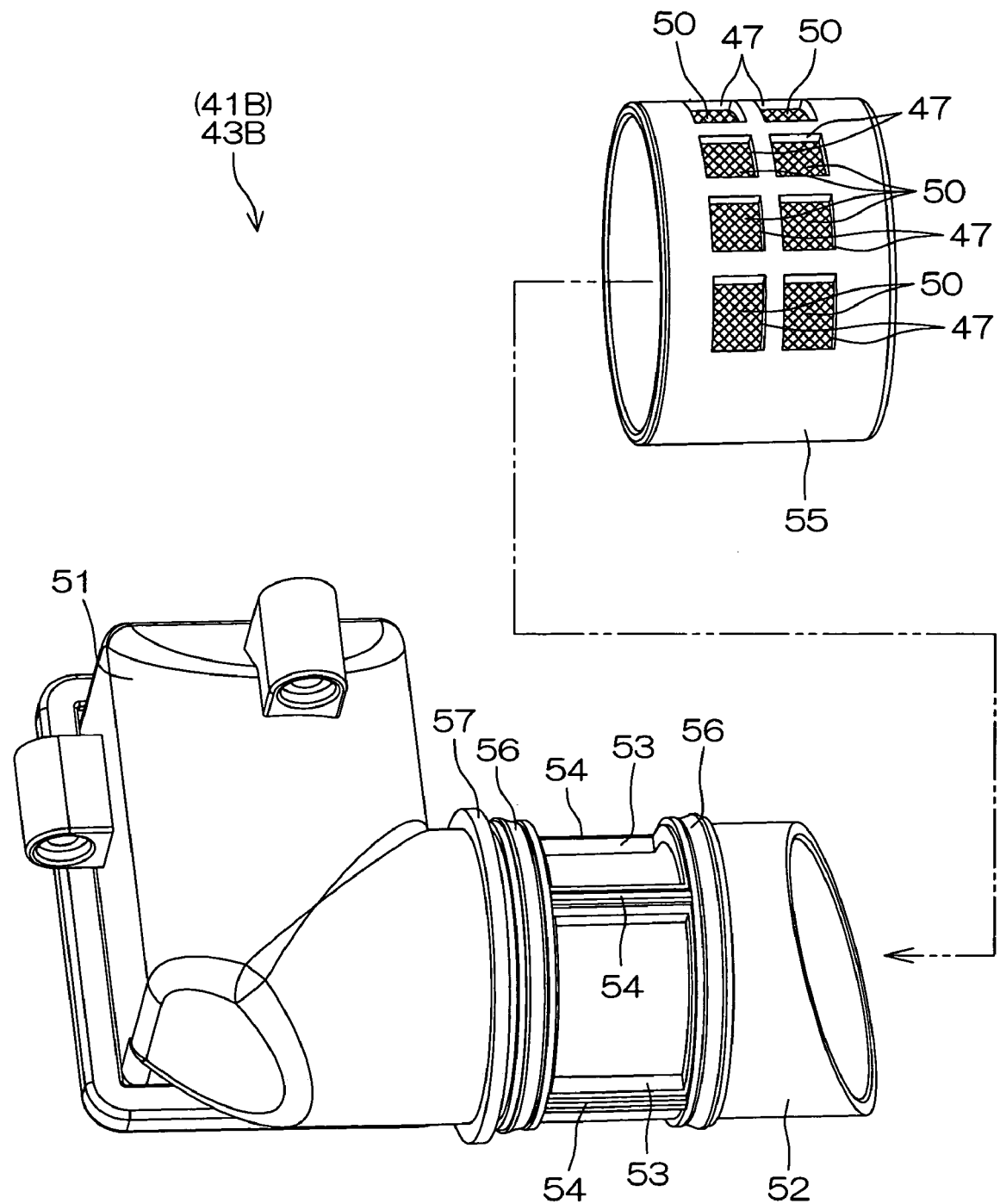
FIG. 13 is an exploded perspective view of the lead-in pipe.

FIG. 12 is a perspective view of a lead-in pipe 43B in accordance with a second modified example when viewed from obliquely above. FIG. 13 is an exploded perspective view of the lead-in pipe 43B.

With reference to FIGS. 12 and 13, the lead-in pipe 43B in this modified example forms a part of the guide pipe 41B for guiding air and dust sucked from the inlet 12 to the dust collection chamber 29. In the lead-in pipe 43B, the flange section 58 equipped with the lead-in pipe 43 in the above-mentioned embodiment is omitted. As described above, since the lead-in pipe 43B in this modified example has the same configuration as the lead-in pipe 43 in the above-mentioned embodiment except that the flange section 58 is omitted, the same reference numerals are given to the similar components and description thereof is omitted.

In the lead-in pipe 43B in this modified example, the passage member 55A having the same configuration as the passage member 55 in the above-mentioned embodiment except that the flange section 58 is omitted is rotatably held by the linear section 52. In this case, the rack 61 arranged on the inner upper face of the inner case 22 (upper portion of the bypass passage 31) of the dust collector 10 in the above-mentioned embodiment so as to slidable in the front-back direction to engage with the teeth 59 of the flange section 58 may be omitted.

With such configuration, although it is impossible that the rack 61 is slid in the front-back direction simultaneously as the first cover 24 and the second cover 25 is opened or closed, thereby rotating the passage member 55 coupled to the rack 61 as in the above-mentioned embodiment, the passage member 55B can be manually rotated.

When the passage member 55B is rotated, maintenance such as removal of dust adhered to the mesh filters 50 can be easily performed.

Especially, when the passage member 55B is rotated, each of the protrusions 54 formed on the outer circumferential face of the linear section 52 of the lead-in pipe 43B is slidingly in contact with the mesh filters 50, thereby shaking dust adhered to the mesh filters 50 off. Thus, the dust adhered to the mesh filters 50 can be easily removed, resulting in easy maintenance.

Figure 14:
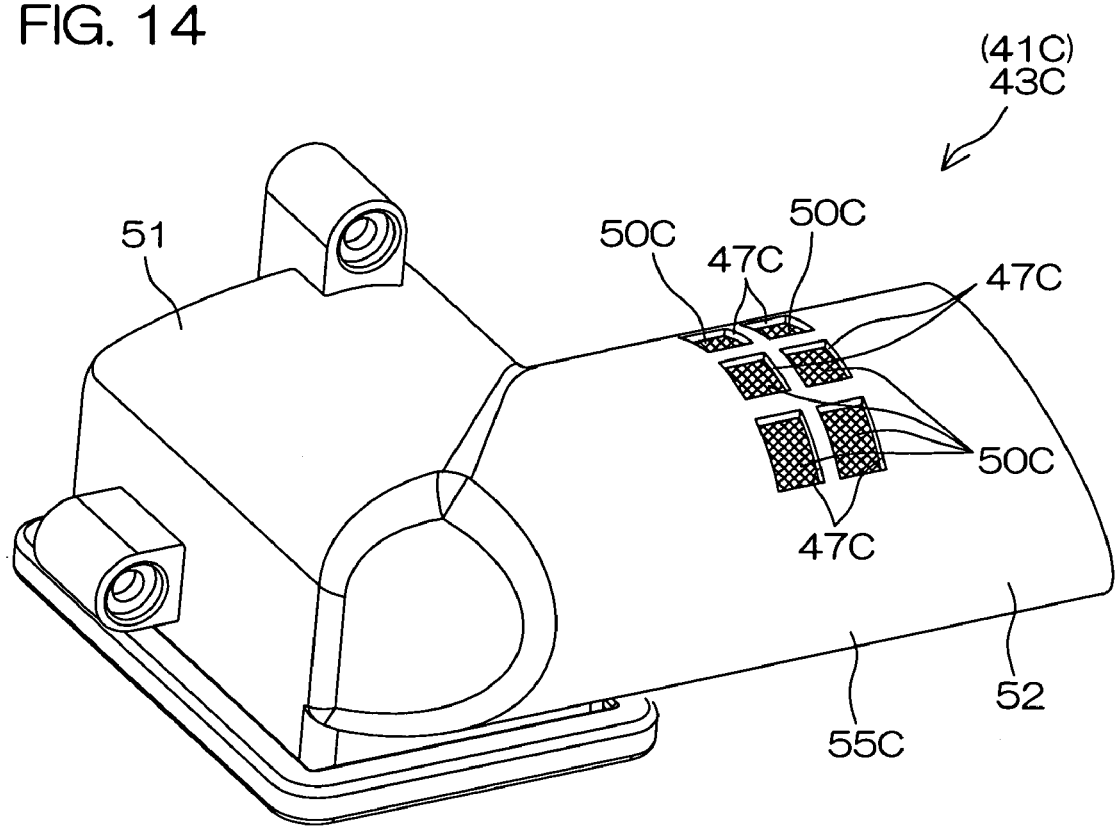
FIG. 14 is a perspective view of a lead-in pipe in accordance with a third modified example when viewed from obliquely above.
Figure 15A:
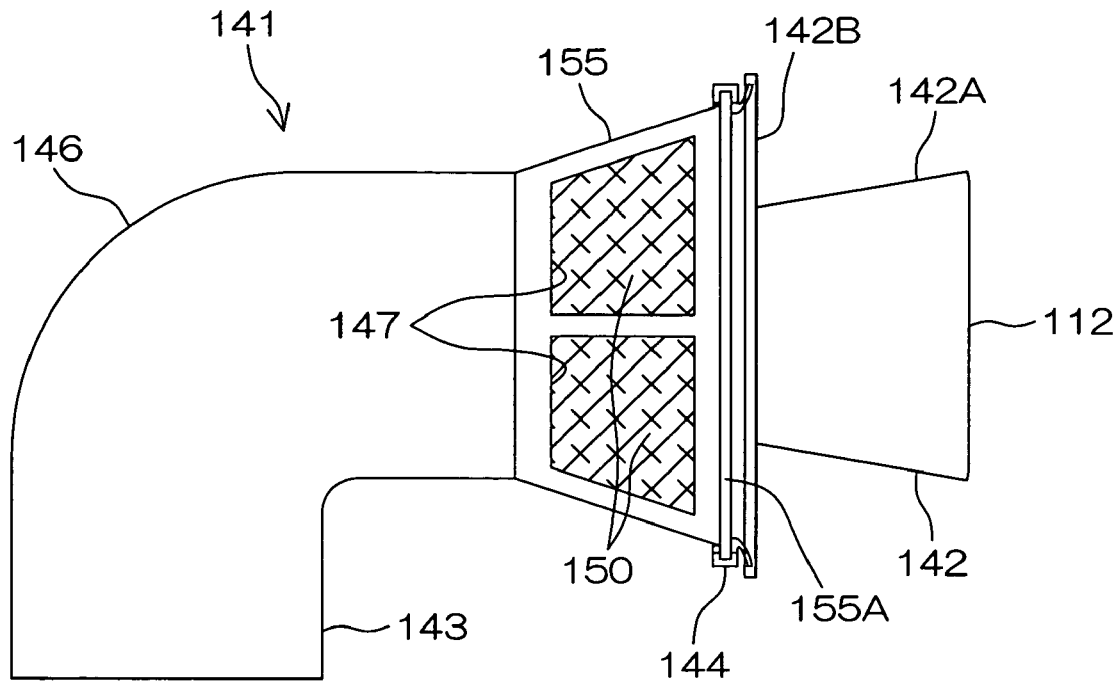
FIGS. 15A and 15B are views showing an example of a guide pipe provided in a conventional dust collector.
Figure 15B:
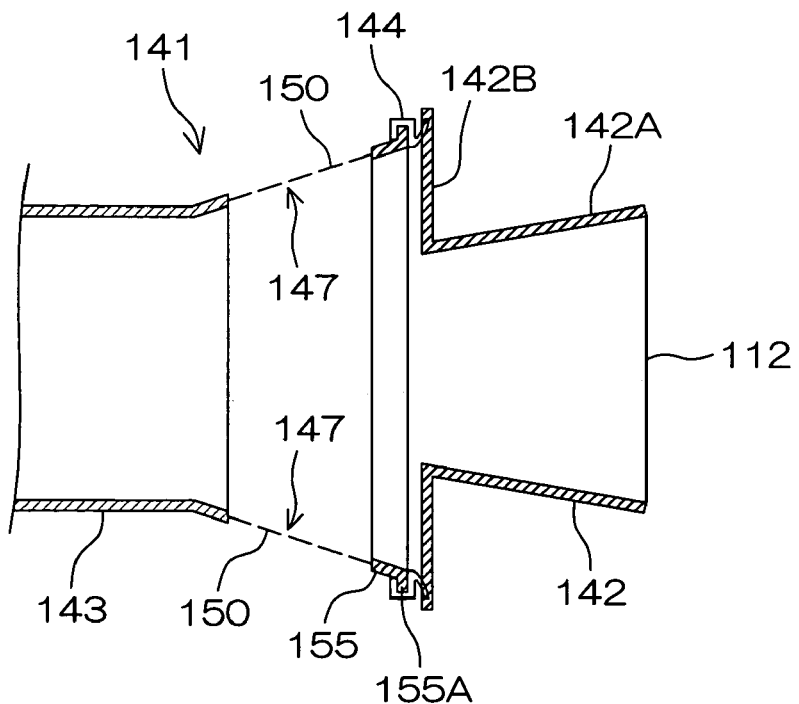

FIG. 14 is a perspective view of a lead-in pipe 43C in accordance with a third modified example when viewed from obliquely above.

With reference to FIG. 14, the lead-in pipe 43C in this modified example forms a part of the guide pipe 41C for guiding air and dust sucked from the inlet 12 to the dust collection chamber 29. In the lead-in pipe 43C, as distinct from the lead-in pipe 43 in the above-mentioned embodiment, the passage member 55 on which the vent holes 47 are formed is not put on the linear section 52 but the vent holes 47C are formed directly on the linear section 52. More specifically, a plurality of substantially rectangular openings are formed on an upper face in the middle of the linear section 52 of the lead-in pipe 43C and these openings form the vent holes 47C. Thus, air flowing in the lead-in pipe 43C can be flown to the outside (the side of the bypass passage 31) in the case where dust is accumulated in the dust collection chamber 29 to some extent. The vent holes 47C are covered with mesh filters 50C and dust that moves in the lead-in pipe 43C toward the bypass passage 31 together with air can be captured with the mesh filters 50C.

Even with this configuration, the part connecting the guide pipe 43C to the bypass passage 31 may be shaped of a cylinder rather than a truncated cone. In the case where the part connecting the guide pipe 43C to the bypass passage 31 is shaped of a cylinder instead of a truncated cone, a narrowed portion with a smaller inner diameter is not formed at the guide pipe 43C. Thus, lowering of suction force caused by pressure loss in the guide pipe 43C can be prevented.

Also, as compared with the case of the truncated cone shape, the cylindrical shape of the part connecting the guide pipe 43C to the bypass passage 31 enables reduction in space for arranging them. Therefore, the dust collection chamber 29 can be made larger, the amount of dust which can be accumulated in the dust collection chamber 29 can be increased, thereby suppressing lowering of suction force. Thus, by preventing lowering of the suction force, suction performance can be improved.

A neighborhood of the region of the linear section 52 of the guide pipe 43 in which the vent holes 47C are formed constitutes a cylindrical filter part 55C arranged so that the axial line may come along the extending direction of the linear section 52. The vent holes 47C and the mesh filters 50 formed on the vent holes 47C extend in parallel to the direction in which air and dust flow in the guide pipe 43C. Accordingly, as the compared with the case where the filter section is formed in the shape of a truncated cone, dust is difficult to adhere to the mesh filters 50C and when a foreign particle having high specific gravity (for example, metal piece) flows into the guide pipe 43C, it can effectively prevent the foreign particle from hitting against the mesh filters 50C, damaging the mesh filters 50C. As described above, since it can be prevented that the flow of air to the bypass passage 31 is deteriorated due to dust adhered to the mesh filters 50C and that a foreign particle flows into and clogs up the bypass passage 31 due to damage of the mesh filters 50C, suction performance can be improved.

The present invention further includes the following modifications.

For example, the vent holes connecting the bypass passage 31 to the guide pipes 41, 41A, 41B and 41C, respectively, are not necessarily covered with the mesh filters 50, 50A and SOC but may be covered with other filters. Alternatively, a plurality of small holes (for example, holes having a diameter of 2 to 3 mm) may be formed instead of the filters. Also, the mesh filters 50, 50A and 50C may be omitted.

The first cover 24 and the second cover 25 each need not have the mesh filters 34, 35, and the filter-paper filter 37 but may have other filters.

The opening 22A of the inner case 22 are not necessarily covered with two covers (the first cover 24 and the second cover 25) but may be covered with one cover or three or more covers.

Although the above-mentioned embodiment uses the upright-type vacuum cleaner 1 as an example of one embodiment according to the present invention, the present invention can be applied to a vacuum cleaner having a main unit that builds an electrical fan therein and a suction section connected to the main unit through a hose, with which the user can perform cleaning while moving the hose and the suction section by holding a holding section formed in the middle of the hose.

What is claimed is:

1. A dust collector for vacuum cleaner for capturing dust sucked from an inlet together with air and discharging the air from an outlet comprising:
   a dust collection chamber for capturing and accumulating the dust entering from the inlet together with air therein;
   a guide path, at least a part of which is a linear section, for guiding the dust and air entering from the inlet to the dust collection chamber;
   a bypass passage for ensuring flow of air by separating a part of air entering from the inlet, allowing the air to bypass the dust collection chamber and guiding the air to the outlet; and
   a cylindrical section that forms a part of the linear section of the guide path and has a vent hole connecting the guide path to the bypass passage on its circumferential face.

2. A dust collector according to claim 1, wherein
a bypass filter capable of capturing dust moving from the guide path toward the bypass passage is formed on the vent hole of the cylindrical section.

3. A dust collector according to claim 1, wherein
the cylindrical section includes a cylindrical body formed separately from the linear section.

4. A dust collector according to claim 3, wherein
the cylindrical section is rotatably held.

5. A dust collector according to claim 4, wherein
a bypass filter capable of capturing dust moving from the guide path toward the bypass passage is formed on the vent hole of the cylindrical section.

6. A dust collector according to claim 5,
further comprising a sliding section that slidingly comes into contact with the bypass filter as the cylindrical section is rotated.

7. A dust collector according to claim 6, wherein
an opening for removing dust accumulated in the dust collection chamber is formed on the dust collection chamber,
the dust collector further comprising:
an open-and-close cover for opening or closing the opening; and
an interlocking mechanism for rotating the cylindrical section simultaneously as the open-and-close cover is opened or closed.

8. A dust collector according to claim 7, wherein
the interlocking mechanism includes a powering means or forcing the cylindrical section to rotate simultaneously as the open-and-close cover is opened.

9. A dust collector according to claim 7, wherein
the vent hole is formed within a prescribed angle in the circumferential direction on a circumferential face of the cylindrical section, and
in the closed state of the open-and-close cover, the vent hole is not opposed to the opening and the cylindrical section is rotated so that the vent hole becomes opposed to the opening simultaneously as the open-and-close cover is opened.

10. A dust collector according to claim 9, wherein
the guide path has a bent section on its part, and
in the closed state of the open-and-close cover, the vent hole is located on the opposite side of a direction in which centrifugal force is applied to dust passing through the vent section of the guide path.

11. A dust collector according to claim 7, wherein
the open-and-close cover includes a first cover for covering the opening and a second cover for an outer side of the first cover,
the first cover and the second cover each is equipped with a vent hole and a dust collection filter capable of capturing dust moving from the dust collection chamber toward the outlet, and
the first cover and the second cover are rotatably held and held at different rotating angles so as not to overlap each other in the state where the covers are opened to the maximum.

12. A dust collector according to claim 7, wherein
the open-and-close cover forms a part of the bypass passage, and
a plane inclined relative to a direction perpendicular to a direction in which air and dust that flows from the guide path to the bypass passage through the vent hole of the cylindrical section head for the open-and-close cover is formed.

13. A dust collector according to claim 1, wherein
a plane inclined relative to a direction perpendicular to a direction in which air and dust that flows from the guide path into the dust collection chamber is formed on the dust collection chamber.

14. A dust collector for vacuum cleaner for capturing dust sucked from an inlet together with air and discharging the air from an outlet comprising:
a dust collection chamber for capturing and accumulating the dust entering from the inlet together with air therein;
a guide path having a bent section on at least a part thereof for guiding the dust and air entering from the inlet to the dust collection chamber;
a bypass passage for ensuring flow of air by separating a part of air entering from the inlet, allowing the air to bypass the dust collection chamber and guiding the air to the outlet; and
a vent hole that is located on the opposite side of a direction in which centrifugal force is applied to dust passing through the bent section of the guide path and connects the guide path to the bypass passage.

15. A dust collector according to claim 14, wherein
the vent hole is located downstream of the bent section of the guide path within a certain distance from the bent section.

16. A dust collector according to claim 14, wherein
the vent hole is equipped with a bypass filter capable of capturing dust moving from the guide path toward the bypass passage.

17. A vacuum cleaner comprising:
an inlet for sucking air and dust;
a dust collection chamber for capturing and accumulating dust therein;
a guide path for guiding air and dust entering from the inlet;
an outlet for discharging the air entering from the inlet; and
a bypass passage having a vent hole for separating a part of air entering from the inlet, for ensuring flow of air by allowing the air entering from the vent hole to bypass the dust collection chamber and guiding the air to the outlet, wherein
the vent hole of the bypass passage is formed in parallel with flow of the air flowing through the guide path.

18. A vacuum cleaner according to claim 17, wherein
the guide path has a cylindrical section extending linearly, and
the vent hole is formed on a circumferential face of the cylindrical section.

19. A vacuum cleaner according to claim 17, wherein
the guide path has a bent section and a linear cylindrical section located downstream of the bent section, and
the vent hole is formed on a circumferential face of the cylindrical section connecting to the bent section.

* * * * *